United States Patent
Ostrowski et al.

(10) Patent No.: US 11,722,398 B2
(45) Date of Patent: Aug. 8, 2023

(54) SYSTEMS AND METHODS FOR OPTIMIZING AN ANTENNA TOPOLOGY OF A VEHICLE

(71) Applicant: Ford Global Technologies, LLC, Dearborn, MI (US)

(72) Inventors: David Alfred Ostrowski, Northville, MI (US); Leopoldo Urbina, Alvaro Obregón (MX); Akshay Dirisala, Olmsted Township, OH (US); Elizabeth Anne Manwell, Canton, MI (US); Austin Kirchner, Denver, CO (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 17/543,048

(22) Filed: Dec. 6, 2021

(65) Prior Publication Data

US 2023/0179508 A1    Jun. 8, 2023

(51) Int. Cl.
*B60R 21/015* (2006.01)
*H04L 45/02* (2022.01)
*G05D 1/00* (2006.01)

(52) U.S. Cl.
CPC ............ *H04L 45/02* (2013.01); *B60R 21/015* (2013.01); *G05D 1/0088* (2013.01)

(58) Field of Classification Search
CPC ...... H04L 45/02; B60R 21/015; G05D 1/0088
See application file for complete search history.

(56) References Cited

U.S. PATENT DOCUMENTS

| | | |
|---|---|---|
| 4,754,255 A | 6/1988 | Sanders et al. |
| 5,622,406 A | 4/1997 | Meschkat et al. |
| 6,195,603 B1 | 2/2001 | Gauger et al. |
| 8,725,311 B1 | 5/2014 | Breed |
| 8,812,065 B2 | 8/2014 | Miller et al. |
| 9,769,297 B2 | 9/2017 | Miller et al. |
| 9,774,717 B2 | 9/2017 | Miller et al. |
| 9,859,998 B2 | 1/2018 | Li et al. |
| 10,046,671 B2 | 8/2018 | Seiller et al. |
| 10,284,709 B2 | 5/2019 | Miller et al. |
| 10,382,569 B2 | 8/2019 | Pei et al. |
| 10,737,787 B2 | 8/2020 | Morin et al. |
| 2014/0309790 A1 | 10/2014 | Ricci |
| 2020/0128354 A1 | 4/2020 | Smith et al. |

FOREIGN PATENT DOCUMENTS

| | | |
|---|---|---|
| CN | 100559207 C | 11/2009 |
| CN | 10734358 A | 11/2017 |

*Primary Examiner* — Mathew Franklin Gordon
(74) *Attorney, Agent, or Firm* — Vichit Chea; Price Heneveld LLP

(57) ABSTRACT

Systems and methods are disclosed for optimizing an antenna topology to detect a seating position of a vehicle occupant. Methods and systems for determining a target position for an antenna of the antenna topology are also disclosed. Determining the target position may be based on a comparison of a predicted seating position to a true seating position.

20 Claims, 19 Drawing Sheets

SYSTEMS AND METHODS FOR OPTIMIZING AN ANTENNA TOPOLOGY OF A VEHICLE

FIELD OF THE DISCLOSURE

The present disclosure generally relates to a vehicle. More specifically, the present disclosure relates to an antenna topology of a vehicle.

BACKGROUND OF THE DISCLOSURE

Vehicles often include antenna topologies. The antenna topologies typically include at least one antenna for communicating with a mobile device in a cabin of the vehicle.

SUMMARY OF THE DISCLOSURE

According to a first aspect of the present disclosure, a method for optimizing an antenna topology to detect a seating position of a vehicle occupant includes receiving, via a processor, signal strength data based on a position of a first signal source relative to an initial position of a second signal source of the antenna topology, determining a predicted seating position based on the signal strength data via the processor, comparing the predicted seating position to a true seating position via the processor, and determining, via the processor, a target position for the second signal source based on the comparison of the predicted seating position to the true seating position.

Embodiments of the first aspect of the disclosure can include any one or a combination of the following features:
- the first signal source being a communication device associated with the vehicle occupant and the second signal source being an antenna that receives a signal from the communication device;
- determining the predicted seating position including determining, based on the signal strength data, a region of the vehicle that corresponds to a location of the communication device via the processor and comparing the region to a plurality of occupant zones associated with positional ranges of a plurality of vehicle seats via the processor;
- determining the predicted seating position including applying a machine learning model trained to associate the position of the first signal source with the true seating position;
- determining, via the processor, a vehicle entry location of the first signal source based on the signal strength data, and determining the predicted seating position being based further on the vehicle entry location;
- the first signal source being a virtual representation of a communication device and the second signal source being a virtual representation of an antenna;
- the antenna topology including a plurality of antennas arranged in a ceiling of a vehicle, and the true seating position being an actual seating position of the vehicle occupant;
- determining the target position for the second signal source being further based on a seating configuration of the vehicle and a model of the vehicle;
- modifying the position of the first signal source while the second signal source is in the target position;
- updating, via the processor, the predicted seating position based on the target position relative to the position of the first signal source;
- updating, via the processor, the target position based on the true position relative to the predicted seating position; and
- modifying the predicted seating position based on the comparison of the predicted seating position to the true seating position.

According to a second aspect of the present disclosure, a system for optimizing an antenna topology of a vehicle including at least one antenna of the antenna topology that receives a signal from a communication device disposed within a cabin of the vehicle, the communication device associated with a vehicle occupant having an actual seating position in the vehicle, and a processor that determines a plurality of occupant zones corresponding to a plurality of seating positions of the cabin, determines a signal strength of the signal based on a position of the communication device relative to a position of the at least one antenna, determines a region corresponding to a location of a communication device associated with a vehicle occupant based on the signal strength, compares the region to the plurality of occupant zones, determines a predicted seating position based on the comparison of the region to the plurality of occupant zones, compares the predicted seating position to an actual seating position of the occupant, calculates differential data based on the comparison of the predicted seating position of the actual seating position, and modifies the position of the at least one antenna based on the differential data.

Embodiments of the second aspect of the disclosure can include any one or a combination of the following features:
- the processor further determining the predicted seating position by applying a machine learning model trained to associate the position of the communication device with the actual seating position;
- the processor further determining a vehicle entry location of the communication device based on the signal strength, and determining the predicted seating position being based further on the vehicle entry location;
- the at least one antenna including a plurality of antennas arranged in a ceiling of the vehicle; and
- the processor further modifying the predicted seating position based on the comparison of the predicted seating position to the actual seating position.

According to a third aspect of the present disclosure, a method for optimizing an antenna topology of a vehicle includes determining, via the processor, a plurality of occupant zones corresponding to a plurality of seating positions of the vehicle, receiving a signal from a communication device disposed in a cabin of the vehicle via the processor, determining a signal strength of the signal based on a position of the communication device relative to a position of at least one antenna of the antenna topology via the processor, determining a region corresponding to a location of the communication device associated with a vehicle occupant based on the signal strength via the processor, comparing, with the processor, the region to the plurality of occupant zones, determining, via the processor, a predicted seating position based on the comparison of the region to the plurality of occupant zones, comparing, with the processor, the predicted seating position to an actual seating position of the occupant, calculating, via the processor, differential data based on the comparison of the predicted seating position of the actual seating position, and modifying the position of the at least one antenna based on the differential data.

Embodiments of the third aspect of the disclosure can include any one or a combination of the following features:

determining the predicted seating position includes applying a machine learning model trained to associate the position of the communication device with the actual seating position;

determining, via the processor, a vehicle entry location of the communication device based on the signal strength, and determining the predicted seating position being based further on the vehicle entry location;

the at least one antenna including a plurality of antennas arranged in a ceiling of the vehicle; and modifying the predicted seating position based on the comparison of the predicted seating position to the actual seating position.

These and other aspects, objects, and features of the present disclosure will be understood and appreciated by those skilled in the art on studying the following specification, claims, and appended drawings.

DETAILED DESCRIPTION OF THE PREFERRED EMBODIMENTS

Figure 1:
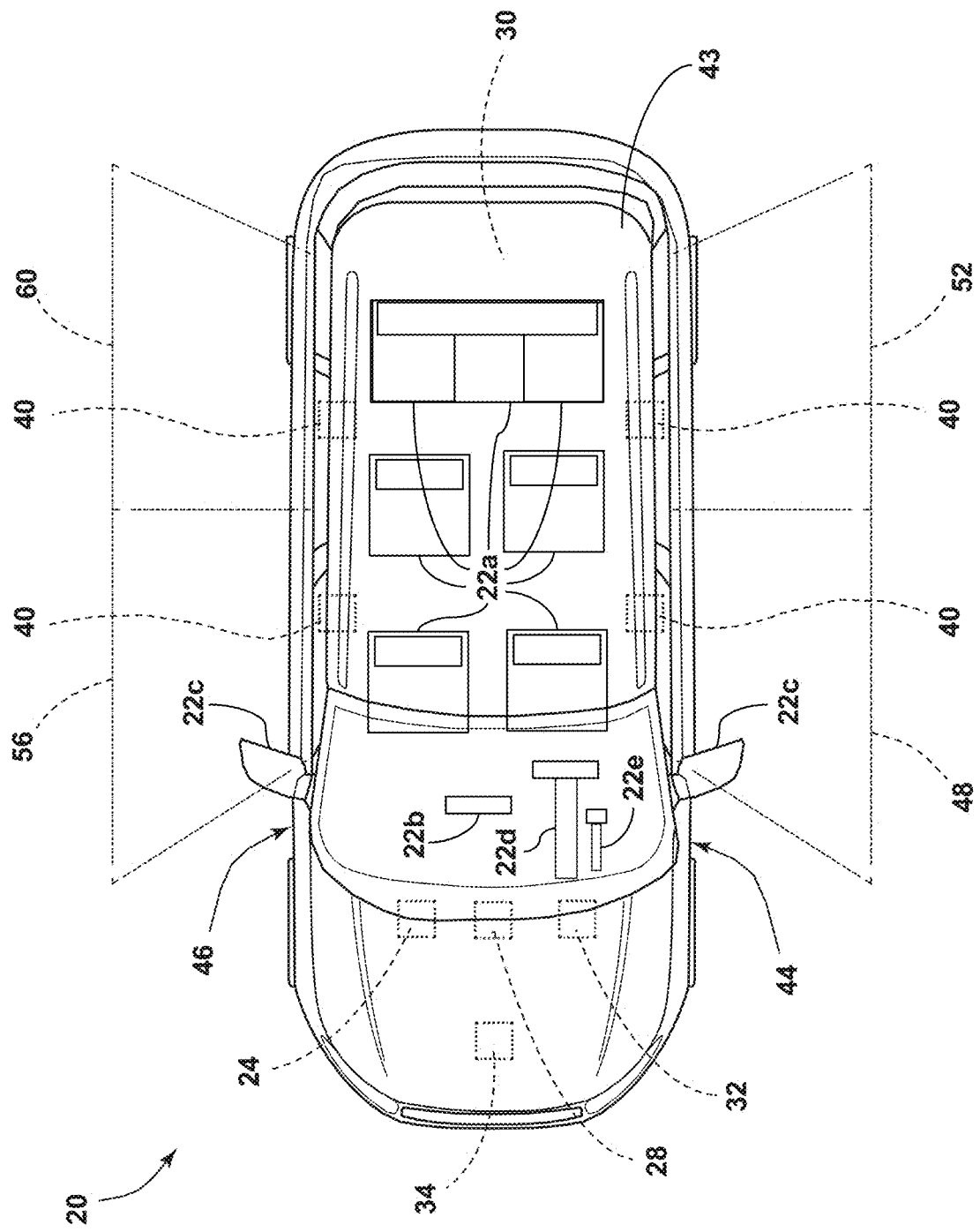
FIG. 1 is a top view of a vehicle illustrating a plurality of entry point zones according to one example.
Figure 2:
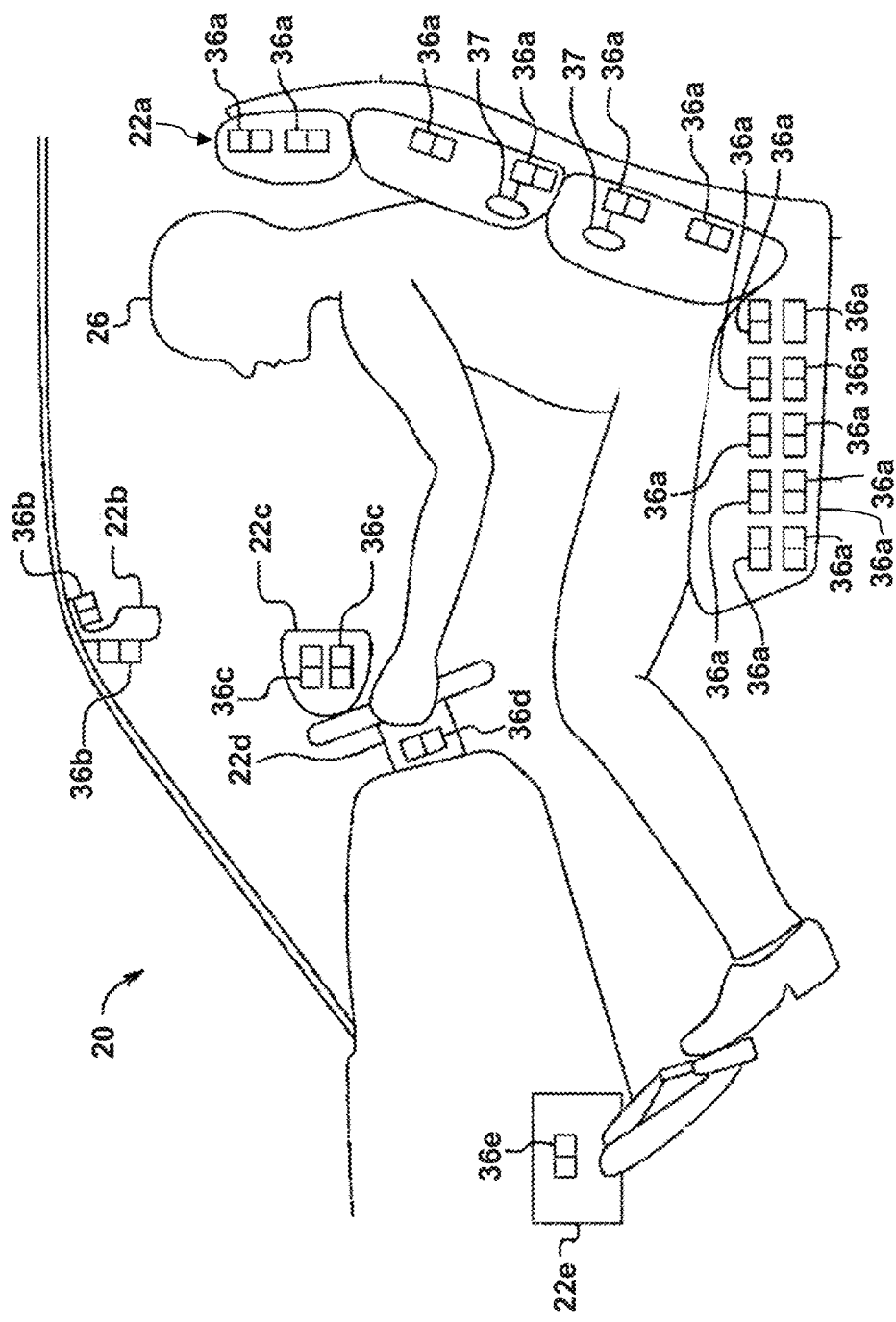
FIG. 2 is a side cross-sectional view of the vehicle illustrating at least one adjustable component according to another example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to adjustable components of a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B iii combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5? of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, reference numeral 20 generally designates a vehicle. The vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many or all-commuting functions (e.g., accelerating, braking, turning, signaling, etc.) independent of user interaction while the user maintains override control of the vehicle 20. It is generally contemplated that the term user can refer to an occupant 26 of the vehicle 20, such as a driver of the vehicle 20 or a non-driver passenger of the vehicle 20.

Referring to FIGS. 1-5, the vehicle 20 can include at least one adjustable component 22. The at least one adjustable component 22 includes various in-cabin and out-of-cabin parts such as a vehicle seat 22a, a rear-view mirror 22b, a side mirror 22c, a steering component 22d, and a pedal assembly 22e. An adjustment control system 24 controls the at least one adjustable component 22 to provide ergonomic support to at least one occupant 26 of the vehicle 20. The vehicle can also include a climate control system 28 that adjusts one or more parameters of a climate of the vehicle 20, including temperature of air delivered to a cabin 30 of the vehicle 20 and a velocity of air delivered to the cabin 30 of the vehicle 20. An occupancy detection system 32 that determines the location of the vehicle 20 occupant 26 within the cabin 30 is also provided with the vehicle 20.

The vehicle 20 also includes a vehicle-based controller 34 stored on the vehicle 20 that include a processor and memory. The memory can store software routines that are executable by the processor. In various situations, some of which will be discussed further herein, the software routines within the memory may be accessed by the vehicle-based controller 34 and/or the processor in response to an input (e.g., from the vehicle 20 and/or the user). The vehicle-based controller 34 is coupled to the vehicle 20 such that the vehicle-based controller 34 is moved through space as the vehicle 20 moves through space. Said another way, the vehicle-based controller 34 is carried by the vehicle 20. The vehicle-based controller 34 communicatively couples with, and/or includes, the adjustment control system 24, the climate control system 28, and the occupancy detection system 32. It is generally contemplated that the vehicle-based controller 34 can be in communication with, or include, additional systems that carry out various functions related to the vehicle 20 and or the at least one occupant 26 of the vehicle 20.

At least one positioning actuator 36 may be positioned about the at least one adjustable component 22 for adjusting the at least one adjustable component 22. For example, and with reference to FIG. 2, the at least one positioning actuator 36 may include a first positioning actuator 36a positioned adjacent a portion of the vehicle seat 22a, a second positioning actuator 36b positioned adjacent a portion of the rear-view mirror 22b, a third positioning actuator 36c positioned adjacent a portion of the side mirror 22c, a fourth positioning actuator 36d positioned adjacent a portion of the steering component 22d, and a fifth positioning actuator 36e positioned adjacent a portion of the pedal assembly 22e. The at least one positioning actuator 36 may include an electric motor, an air pump having a bladder 37, a solenoid, and/or another electro-mechanical adjustment device. According to some aspects of the present disclosure, the at least one positioning actuator 36 may be controlled to position the vehicle seat 22a closer or further from any one of the rear-view mirror 22b, the side mirror 22c, the steering component 22d, and the pedal assembly 22e. It is generally contemplated that the pedal assembly 22e may be a brake pedal assembly for control ling a braking system of the vehicle 20 or a gas pedal assembly for controlling delivery of fuel to an engine of the vehicle 20.

According to some examples, the vehicle seat 22a may include various adjustment parameters controlled via the adjustment control system 24, including but not limited to backrest angle, cushion edge, fore-and-aft positions, head support angle, head support level, seat depth, seat height, shoulder support, variable head support, cushion tilt, seat message, side bolster settings, and lumbar support. The steeling component 22d may, also include various adjustment parameters controlled via the adjustment control system 24, such as vertical (e.g., rake) position, and telescopic position (e.g., the steering wheel closer to/further from the vehicle seat 22a). The mirrors 22b, 22c may also include various adjustment parameters controlled via the adjustment control system 24, such as horizontal and vertical tilt angles.

Figure 3:
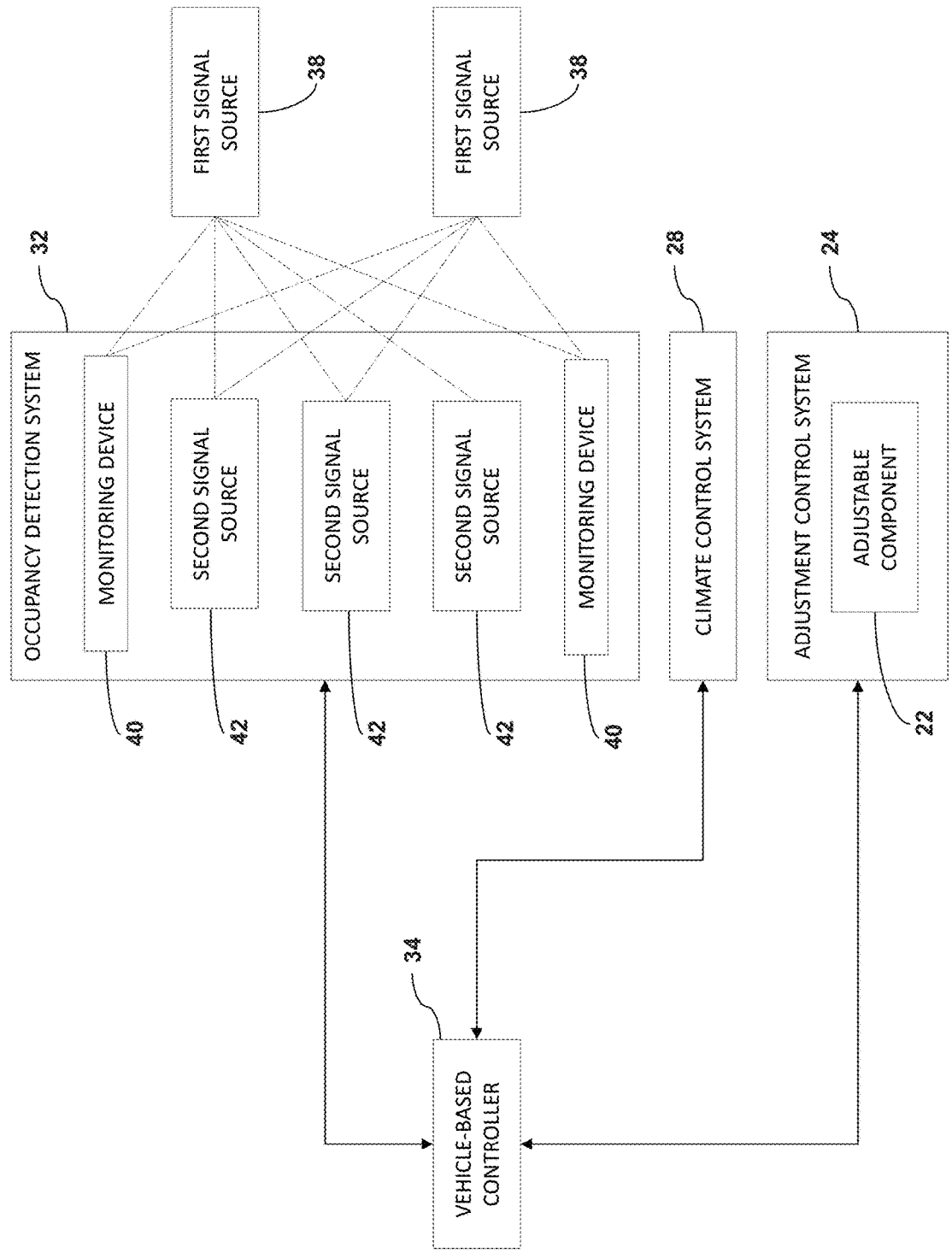
FIG. 3 is a block diagram of components that are in communication with a vehicle-based controller according to another example.

Referring to FIG. 3, the occupancy detection system 32 may include various devices for detecting a first signal source 38 associated with at least one vehicle occupant 26. For example, the occupancy detection system 32 can include at least one monitoring device 40 for monitoring an entry point of the at least one vehicle occupant 26. The at least one monitoring device 40 can be an imager, a proximity sensor, an antenna, or any other device that detects the presence of a person. For example, the monitoring device 40 may be a proximity sensor for detecting the present of a vehicle occupant 26, or may be an antenna for detecting a mobile device having Bluetooth, Wi-Fi, ZigBee, or other wireless communication protocol capabilities. By detecting the mobile device, the monitoring device 40 may infer the presence of the vehicle occupant 26. The point of entry for the first signal source 38 may be referred to as the vehicle 20 entry location of the first signal source 38. The point of entry may generally refer to the entry location of the at least one occupant 26.

The occupancy detection system 32 also includes at least one second signal source 42 that detects the presence of the first signal device. The second signal source 42 may be an antenna that receives and/or transmits radio waves in order to determine a location of the first signal source 38. The at least one second signal source 42 may be a plurality of second signal sources 42 that, together, serve to identify or approximate a location of the first signal source 38 via triangulation or trilateration and signal strength detection (e.g., received strength signal indication (RSSI)). The at least one second signal source 42 may be fixed within a wall of the vehicle 20, such as a ceiling 43 of the vehicle 20. The location of the at least one second signal source 42 may determine the accuracy and/or precision of the approximate location of the first signal source 38, and may further depend on the relative position of the second signal source 42 and the first signal source 38.

Figure 4:
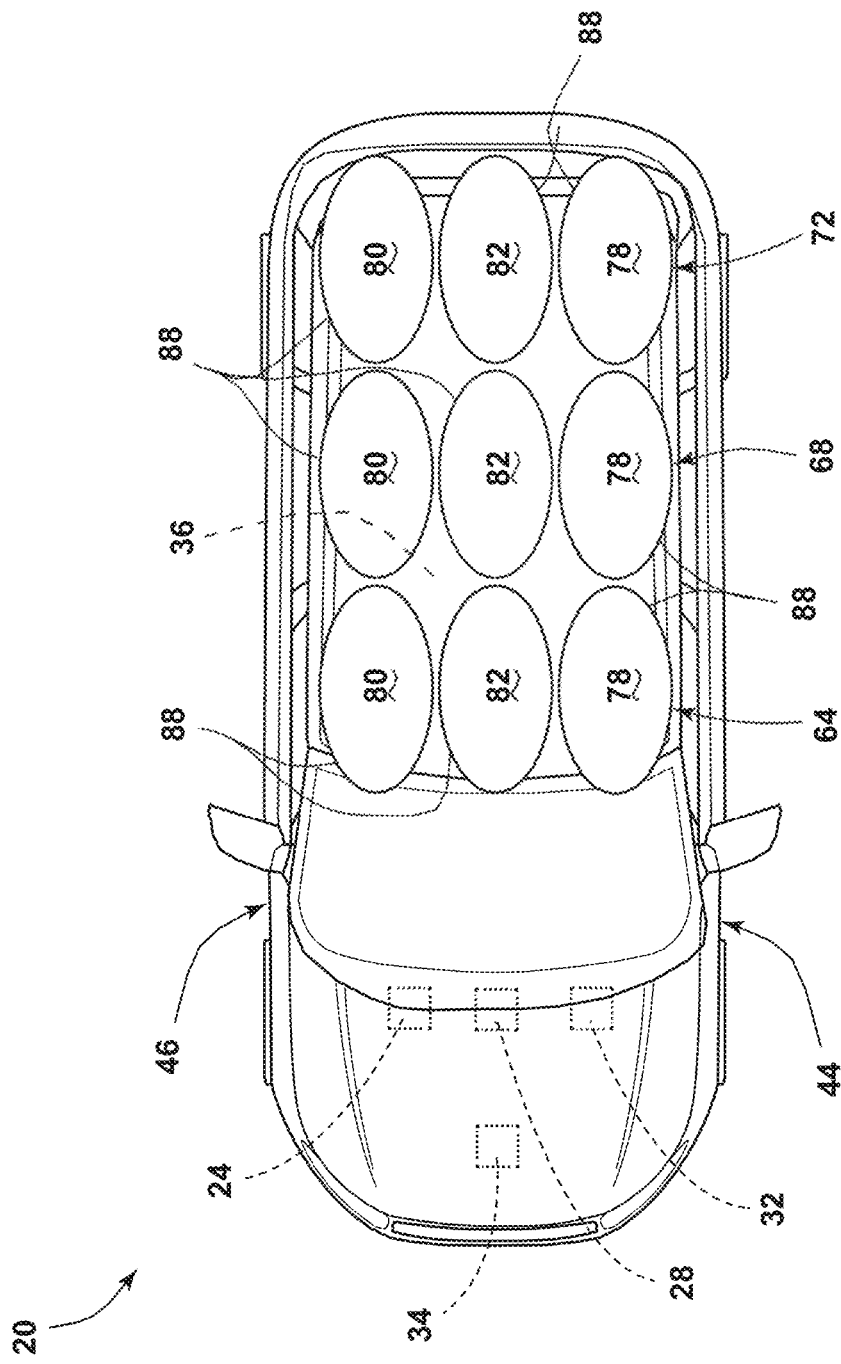
FIG. 4 is a top view of the vehicle illustrating occupant zones according to another example.
Figure 5:
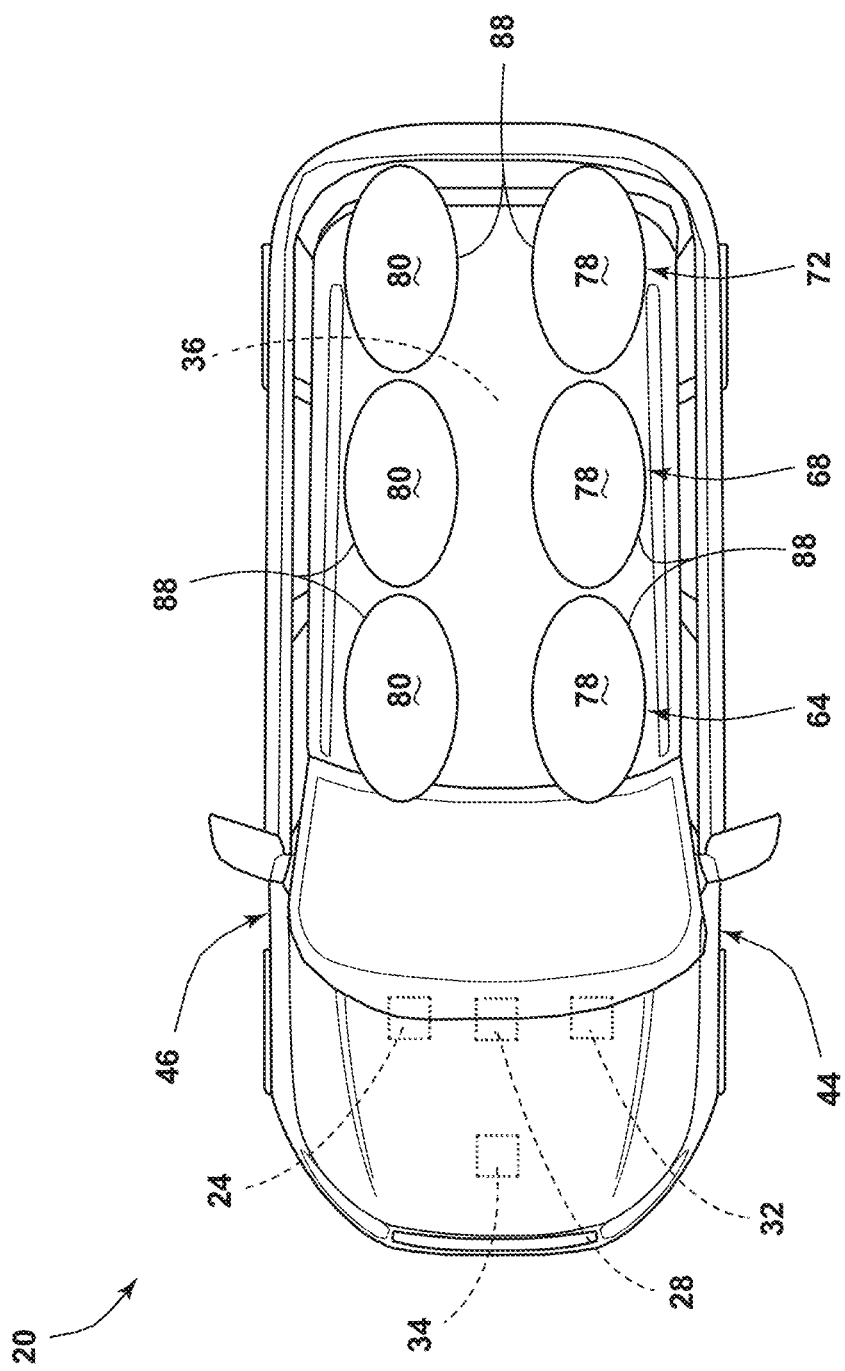
FIG. 5 is a top view of the vehicle illustrating the occupant zones according to another example.
Figure 6:
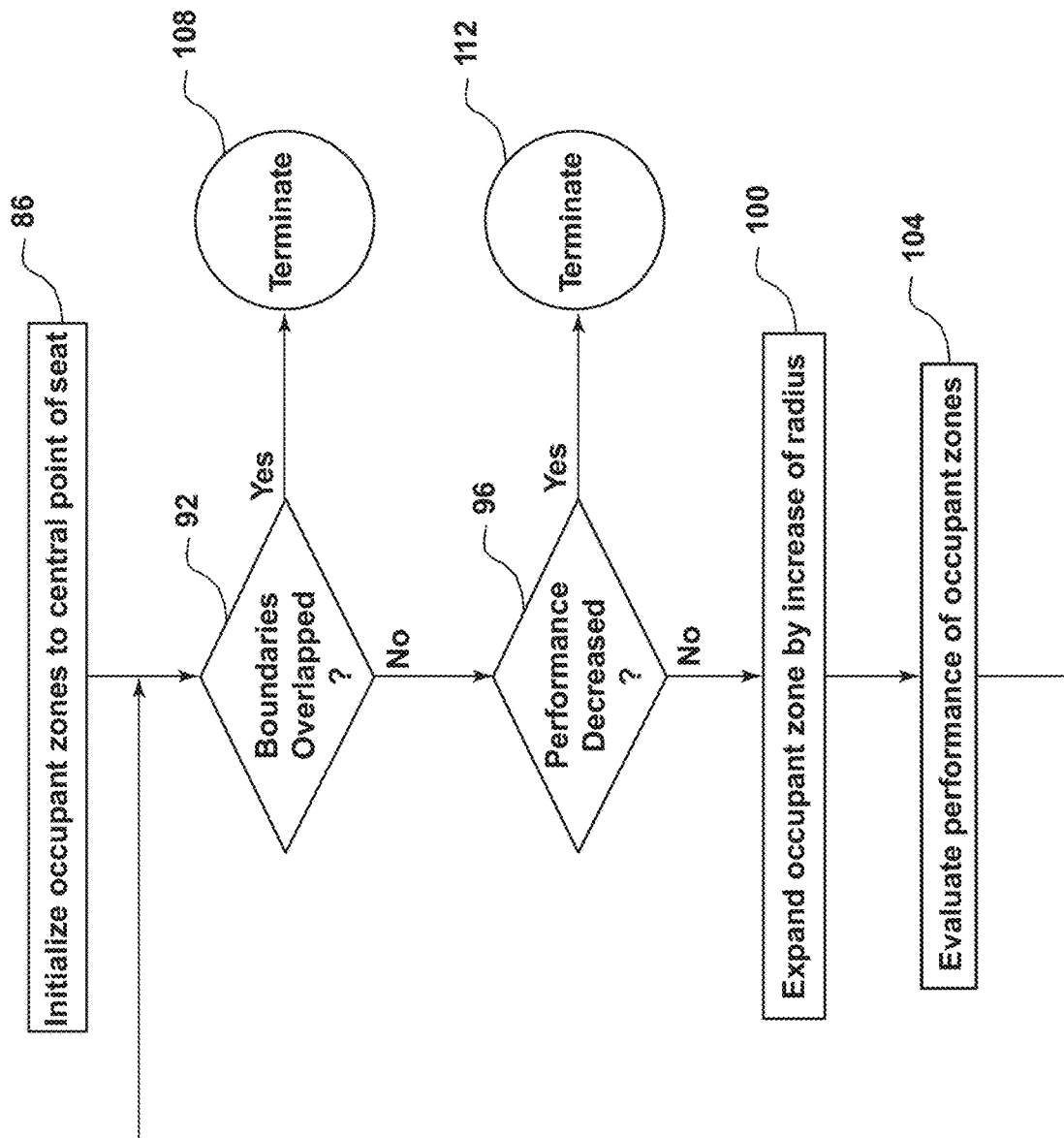
FIG. 6 is a flow diagram of a method of executing a trained model according to another example.
Figure 7:
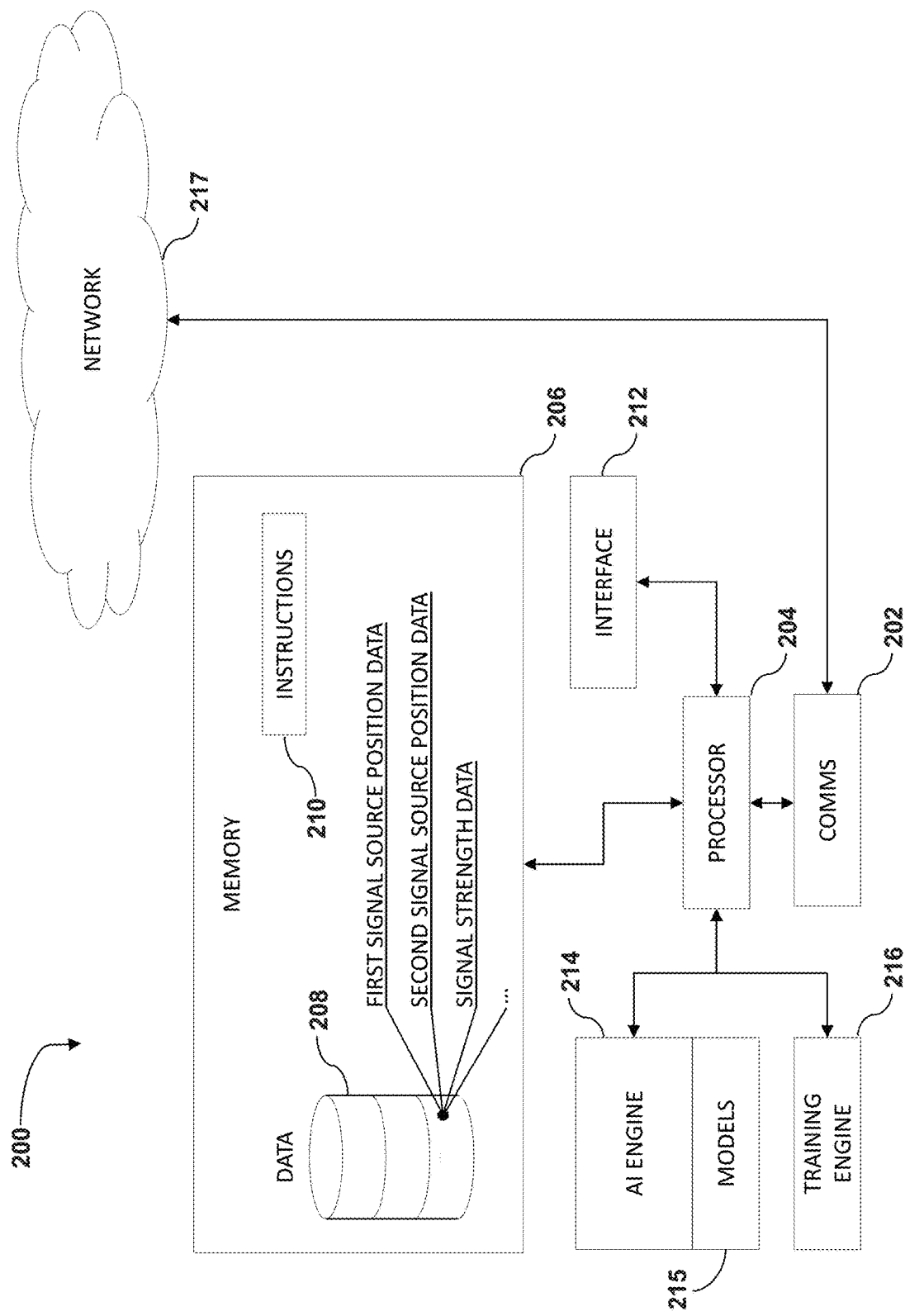
FIG. 7 is a block diagram of a system for optimizing an antenna configuration according to another example.

Referring to FIGS. 4 and 5, the vehicle 20 can be provided with a plurality of entry points for occupants 26. For example, at least one of the plurality of entry points can be positioned on a driver's side 44 of the vehicle 20. Similarly, at least one of the plurality of entry points can be positioned on a passenger's side 46 of the vehicle 20. While the terms "driver's side" and "passenger's side" are used to distinguish a first side of the vehicle 20 from a second side of the vehicle 20, these terms are not intended to be limiting. For example, when the vehicle 20 is fully-autonomous, conventional operator controls may be omitted from the cabin 30 such that an occupant 26 seated on the driver's side 44 and in a forward-most row of the vehicle 20 may not be actively driving the vehicle 20. The driver's side 44 and the passenger's side 46 may each be provided with one or more access doors through which an occupant 26 or occupants 26 may enter or exit the cabin 30. The one or more access doors may be monitored via the occupancy detection system 32 to determine a point of entry for a given occupant 26 and/or a number of occupants 26 that have entered a given access door. For example, if the driver's side 44 and the passenger's side 46 are each provided with two access doors, then the driver's side 44 can be provided with a first entry point zone 48 and a second entry point zone 52 while the passenger's side 46 is provided with a third entry point zone 56 and a fourth entry point zone 60. The first and third entry point zones 48, 56 may be associated with a first row of seats 64 in the cabin 30, The second and fourth entry point zones 52, 60 may be associated with a second row of seats 68 and/or a third row of seats 72. The first, second, third, and fourth entry point zones 48, 52, 56, 60 may be monitored independently. For example, the monitoring device 40 may be positioned proximate to each of the access doors for monitoring the point of entry of the at least one vehicle occupant 26 and/or the vehicle 20 entry location of the first signal source 38.

Referring yet again to FIGS. 1-5, identifying the point of entry of a given occupant 26 or user can be beneficial in determining which row of seats the individual is likely to be occupying and/or which seating assembly within the rows of seats the individual is likely to be occupying. Additionally, or alternatively, the occupancy detection system 32 can identify the point of entry of the at least one occupant 26 as a cross-reference with additional data to determine a specific location of an individual user or occupant 26. For example, proximity sensors, RSSI antennas, weight sensors, seat strap sensors, and the like may be employed within the cabin 30 to identify occupied seating assemblies. It is contemplated that the vehicle-based controller 34 may be provided with an arrangement of the seating assemblies within the cabin 30 of the vehicle 20 and/or the vehicle-based controller 34 may be provided with a list of possible arrangements of the seating assemblies within the cabin 30 of the vehicle 20. The information with regard to the arrangement, or possible arrangements, of the cabin 30 can aid in establishing a number of seating positions. For example, each of the rows of seats (e.g., the first row of seats 64, the second row of seats 68, and/or the third row of seats 72) may be provided with a first seat 78, a second seat 80, and/or a third seat 82.

Referring again to FIGS. 1-5, the first seat 78 may be positioned nearest to the driver's side 44 of the vehicle 20. The second seat 80 may be positioned nearest to the passenger's side 46 of the vehicle 20. The third seat 82 may be positioned between the first and second seats 78, 80, for example, as a middle seat. By "knowing" the available seating positions, at least one of the vehicle-based controller 34 and the occupancy detection system 32 may be better enabled to determine a location of a given occupant 26 and/or distinguish between adjacent occupants 26. For example, the vehicle-based controller 34 and/or the occupancy detection system 32 may be capable of determining a number of communication devices, such as personal devices (e.g., smartphones, smartwatches, or other wearable/carryable smart-enabled technologies) within the cabin 30 by referencing one or more inputs from sensors of the vehicle 20. The location of a given one of the communication devices may be determined, for example, by triangulation or trilateration with RSSI antennas. The determined location of the given one of the communication devices may then be compared with the "known" seating positioned of the vehicle 20. In the event that the determined location of the given one of the communication devices does not reside within one of the "known" seating positions, additional steps may be taken in an effort to refine the determined location and/or the "known" seating positions.

The occupancy detection system 32 may receive occupant data that includes identification information and demographic information corresponding to the at least one occupant 26. For example, the occupant data may include age, sex, name, race, familial status, height, and weight information, as well as various preferential information, such as hobby interests, musical preferences, and the like. It is generally contemplated that the occupant data can further include any information stored on the occupant's smart device, such as a smartphone, including social media information and preferences, the occupant's name, domicile, place of work, and the like. In some example, the identification information may include an identity of a first occupant and an identity of a second occupant of the vehicle 20. The occupant data can have varying levels of specificity as to the identity or demographic information corresponding to the at least one occupant 26. By way of example, if the at least one occupant 26 is a married, 35-year-old father of 4 children, being six feet tall, weighing 200 pounds, and named "John Smith" the occupant 26 data may only utilize one aspect e.g., "male") or may utilize several aspects (e.g., "35-year-old father").

Referring now to FIGS. 2-6, in determining a location of a given occupant 26, or occupant's communication device, a trained model may be employed. The trained model can be executed on the vehicle-based controller 34 and/or a controller that is in communication with the vehicle-based controller 34 (e.g., a controller on the user's communication device, a controller that is remote from the vehicle 20, a cloud-based controller, etc.). It is generally contemplated that the occupancy detection system 32 or the vehicle-based controller 34 can determine a current occupancy configuration from a plurality of occupancy configurations of the vehicle 20 by utilizing the trained model. An occupancy configuration may refer to a seating position arrangement of and/or an identity of the plurality of occupants 26 in the vehicle 20.

As a starting point, a method 84 of executing the trained model may begin with step 86 of initializing an occupant zone to a central point of each "known" seating position. The occupant zones can each have a boundary 88. Once the occupant zones have been initialized at each of the "known" seating positions, the method 84 advances to decision point 92, where the method 84 determines if adjacent ones of the boundaries 88 of the initialized occupant zones overlap with one another. If, at decision point 92, the method 84 determines that the boundaries 88 of adjacent initialized occupant zones do not overlap, then the method 84 advances to decision point 96. At decision point 96, the method 84 determines whether performance of locating the occupant 26, or the occupant's communication device, to a "known" seating position has decreased. For example, a distance between the occupant 26, or the occupant's communication device, and the boundaries 88 may be monitored. If the distance between the occupant 26, or the occupant's communication device, and the boundaries 88 have decreased or stayed the same when compared to the initialized occupant zone, then decision point 96 would indicate that the performance of the locating of the occupant 26, or the occupant's device, to one of the "known" seating positions has not decreased.

Referring again to FIGS. 2-6, if the method 84 determines at decision point 96 that the performance of locating the occupant 26, or the occupant's communication device, to a "known" seating position has not decreased (i.e, improved or stayed the same), then the method 84 advances to step 100 of expanding the boundaries 88 of the occupant zones by increasing a radius of the boundaries 88. In examples where the boundaries 88 are defined by more than one axis (e.g., an ellipse with a major axis and a minor axis), then the axes may be increased sequentially or simultaneously. Similarly, the axes may be increased at varied rates. For example, the major axis may extend in a longitudinal direction (i.e., front-to-rear) of the vehicle 20 and may be increased at a faster rate than the minor axis, which may extend in a lateral direction (i.e., side-to-side) of the vehicle 20. In so doing, a surface area and/or volume covered by the boundaries 88 may be increased in a manner that decreases a chance of capturing an adjacent occupant 26 or an adjacent occupant's communication device. Therefore, inaccurately assigning an occupant 26 to a given "known" seating position may be more readily avoided. A performance of the locating of the occupant 26, or the occupant's device, to one of the "known" seating positions is evaluated at step 104. As with decision point 96, a distance between the occupant 26, or the occupant's communication device, and the boundaries 88 can be evaluated at step 104.

Once the performance of the expanded boundaries 88 of the occupant zones have been evaluated at step 104, the method 84 can return to decision point 92 and repeat the method 84 in an iterative manner. The method 84 may be terminated at step 108 when the boundaries 88 have been determined to overlap at decision point 92 or at step 112 when the performance evaluated at decision point 96 has decreased. In the event that the boundaries 88 have been determined to overlap and/or the performance has decreased, the method 84 may revert back to the immediately preceding boundaries 88 to avoid such overlap and/or such a decrease in performance. Once the boundaries 88 of the occupant zones have been established and the occupant 26, or the occupant's communication device, has been located to one of the "known" seating positions, the one or more adjustable components 22 of the vehicle 20 may be monitored for the individual in the given "known" seating position. The one or more adjustable components 22 can include, but are not limited to, the vehicle seat 22*a*, the vehicle mirrors 22*b*, the side mirror 22*c*, the steering component 22*d*, the gas or brake pedal, and the like.

It is generally contemplated that the ability to train models to determine a seating position of the at least one occupant 26 is limited by certain hardware capabilities of the occupant detection system 32. For example, if the occupant detection system 32 includes only one monitoring device 40 or one antenna, then approximating the location of a mobile device or some other communication device may be challenging as compared to implementing multiple monitoring devices 40 or multiple antennas. Accordingly, systems and methods for optimizing the occupancy detection system may include providing an optimized antenna topology.

Referring now to FIGS. 7-11, a system for optimizing an antenna apology to detect a seating position of a vehicle occupant 26 in a vehicle is generally illustrated at 200. The system 200 includes a communication interface 202 that is communicatively coupled with a processor 204. The system 200 can include one or more computers that may include virtual machines. The system 200 further includes a memory 206 having a database 208 and instructions 210 that, when executed by the processor 204, are operable to perform various functions related to optimizing an antenna topology to detect a seating position of the at least one vehicle occupant 26. A human-machine interface 212 may be communicatively coupled with the processor 204 for interacting with data stored in the database 208. The human-machine interface 212 may also be utilized to communicate with an artificial intelligence engine 214, which may be provided for interacting with the data stored in the memory 206 when performing various techniques, such as generating machine learning models 215. The models 215 may be trained to predict seating positions for the at least one occupant 26. The models 215 may also be trained to associate a position of the first signal source 38 with a true seating position of the at least one occupant 26. The models 215 may be trained on the data stored in the database 208 in order to associate a position of the first signal source 38 with a particular seating position.

The one or more machine learning models 215 may comprise a single level of linear or nonlinear operations and/or the machine learning models 215 may be trained via a deep network, i.e., a machine learning model 215 comprising multiple levels of nonlinear operations. Deep networks may include neural networks including generative adversarial networks, convolutional neural networks, recurrent neural networks with one or more hidden layers, and fully connected neural networks. A training engine 216 may be communicatively coupled with the processor 204 capable of training the models 215 based on data stored in the database 208, as well as feedback from one or more operators of the system 200. The training engine 216 may be a rackmount server, a personal computer, a smart phone, and Internet of things (IoT) device, or any other desired communication device. The machine learning models 215 may be trained to receive positional data related to the first signal source 38 and/or the second signal source 42, and map or otherwise associate, or algorithmically associate, the positional data with a seating position. The system 200 may include a network 217 that communicates with the communication interface 202. According to some aspects, the network 217 may include wired and/or wireless network connections, including Bluetooth, Zigbee, near-field communications, a cellular data network, and the like.

Referring now to FIG. 8-11 more specifically, the system 200 may be employed on either or both of a physical vehicle and a digital approximation of a vehicle. In either case, the digital vehicle and/or the vehicle is employed to simulate/execute various tasks carried out by the system 200. Although a real vehicle or a digital vehicle may be employed for the system 200, as used in reference to the remaining figures, the term "vehicle" can be used to refer to both an actual vehicle and a virtual representation of a vehicle. Further, other elements of the vehicle 220, such as cabin 230, may refer to a real or a virtual location. Similarly, the terms "communication device" and "antenna" may refer to a virtual representation of the first and second signal sources 38, 42, respectively, or may refer to an actual communication device 226 smartphone) and an actual antenna, respectively.

As illustrated, an antenna topology 218 can include at least one antenna 222 that receives a signal from at least one communication device 226 disposed within a cabin 230 of the vehicle 220. The communication device 226 may be associated with the vehicle occupant 26 having an actual seating position in the vehicle 220. In principal, tracking the location of the communication device 226 (e.g., smartphone) of the occupant 26 also tracks the vehicle occupant 26. It is generally contemplated that a position of the communication device 226 may, in many cases, not be in the actual seating position of the occupant 26. However, the actual seating position of the occupant 26 may nonetheless correspond to the position of the communication device 226. Stated differently, "knowing" the position of the mobile device that is associated with the vehicle occupant 26 can, in most cases, provide the position of the vehicle occupant 26, whether or not the communication device 226 is positioned on the true vehicle seat of the vehicle occupant 26. For example, a driver may keep her phone on a front passenger seat when she is the only vehicle occupant 26. In this non-limiting example, the position of the communication device 226 may still relate to the actual seating position, as well as the vehicle entry location and/or other locations detected via the system 200. Accordingly, approximating the position of the communication device 226 can provide a more precise estimation and/or determination of the true seating position of the vehicle occupant 26.

Figure 8:
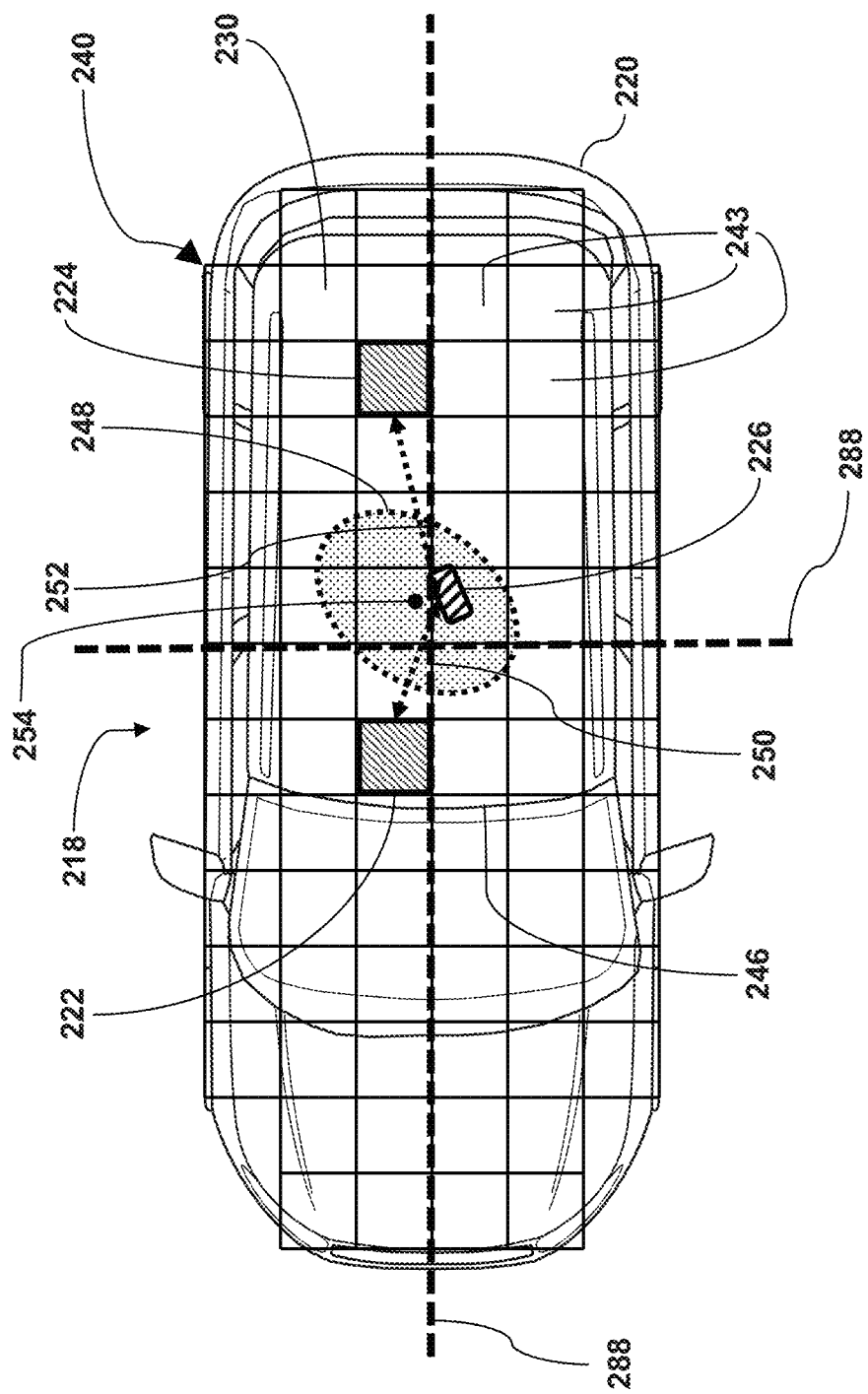
FIG. 8 generally illustrates a top view of the antenna topology for a vehicle according to another example.
Figure 10:
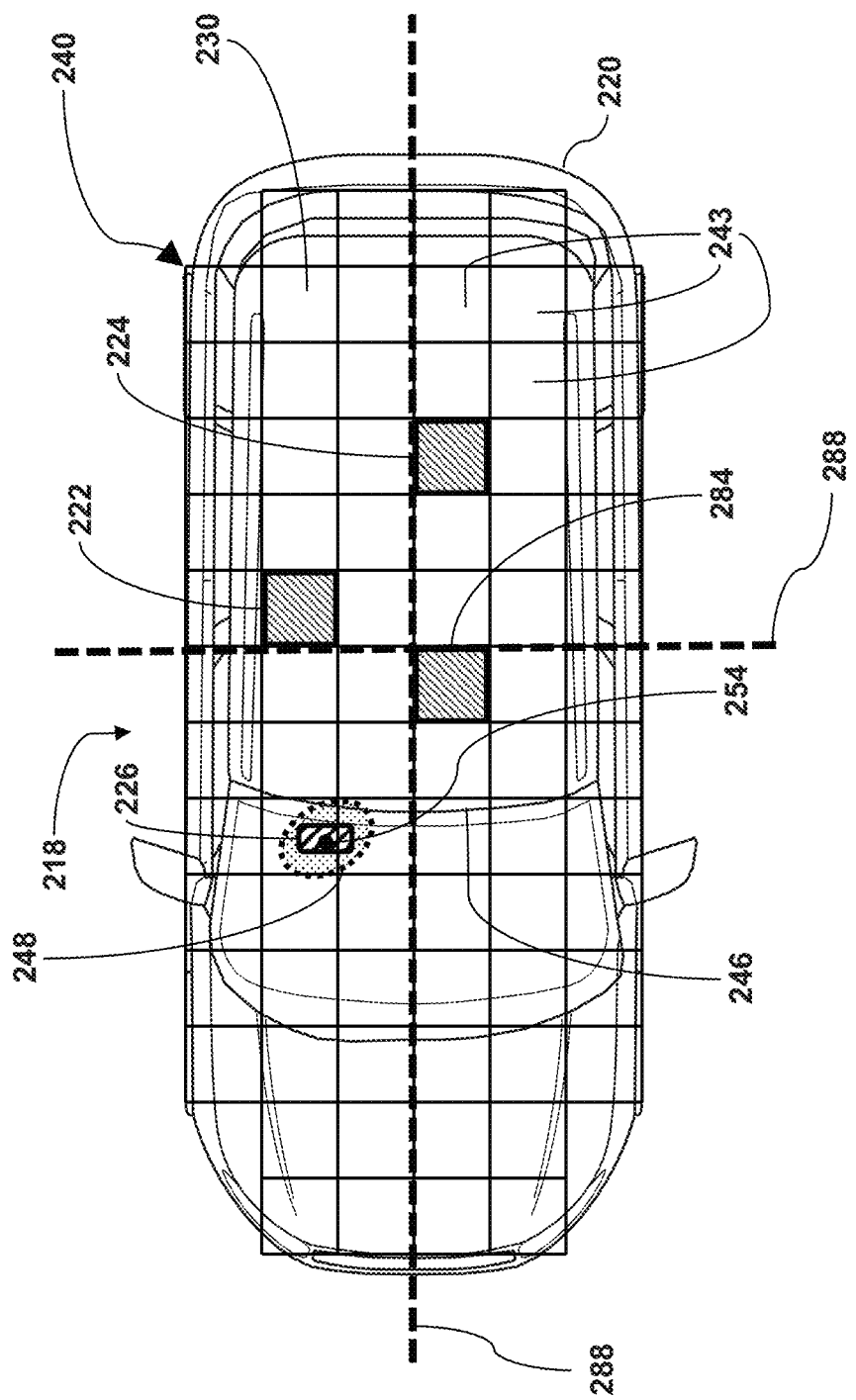
FIG. 10 generally illustrates a top view of the antenna topology for a vehicle according to another example.

As generally demonstrated in FIGS. 8 and 10, the at least one antenna 222 may include a plurality of antennas 222, 224 distributed along a grid map 240 overlaying an area of the vehicle 220. The grid map 240 may define a plurality of sectors 243 that that can be uniformly dimensioned or, alternatively, a plurality of sectors 243 that are not uniformly dimensioned. In the example illustrated, the grid map 240 is laid out in approximately a 14×5 sector distribution having front and rear portions that are narrower than a body portion of the grid map 240. Stated differently, the front portion may operate with lesser sectors 243, as may the rear portion, than the body portion, as illustrated.

It is generally contemplated that the grid map 240 approximates at least a portion of a ceiling 246 of the vehicle 220 and may include portions adjacent a windshield and/or a hood of the vehicle. The grid map 240 may serve as a universal standard that applies to a plurality of models of a vehicle 220. In this way, the grid map 240 may serve as a standardized testing apparatus for a fleet of vehicles to determine the optimal antenna topology 218 for each vehicle 220 of the fleet of vehicles. What is more, the grid map 240 may allow for simulating a plurality of positions for the at least one antenna 222, 224. As illustrated in FIG. 8, the at least one antenna 222, 22.4 may include a first antenna 222 and a second antenna 224. The first antenna 222 is exemplarily shown in the sector 7,4 (corresponding to a lengthwise dimension of the vehicle 220 and a width-wise dimension of the vehicle 220, respectively), and the second antenna 224 is exemplarily shown in sector 7,4. The sector number may correspond to positional data that is stored in the database 208 and capable of being processed by the processor 204 to perform various tasks.

Figure 9:
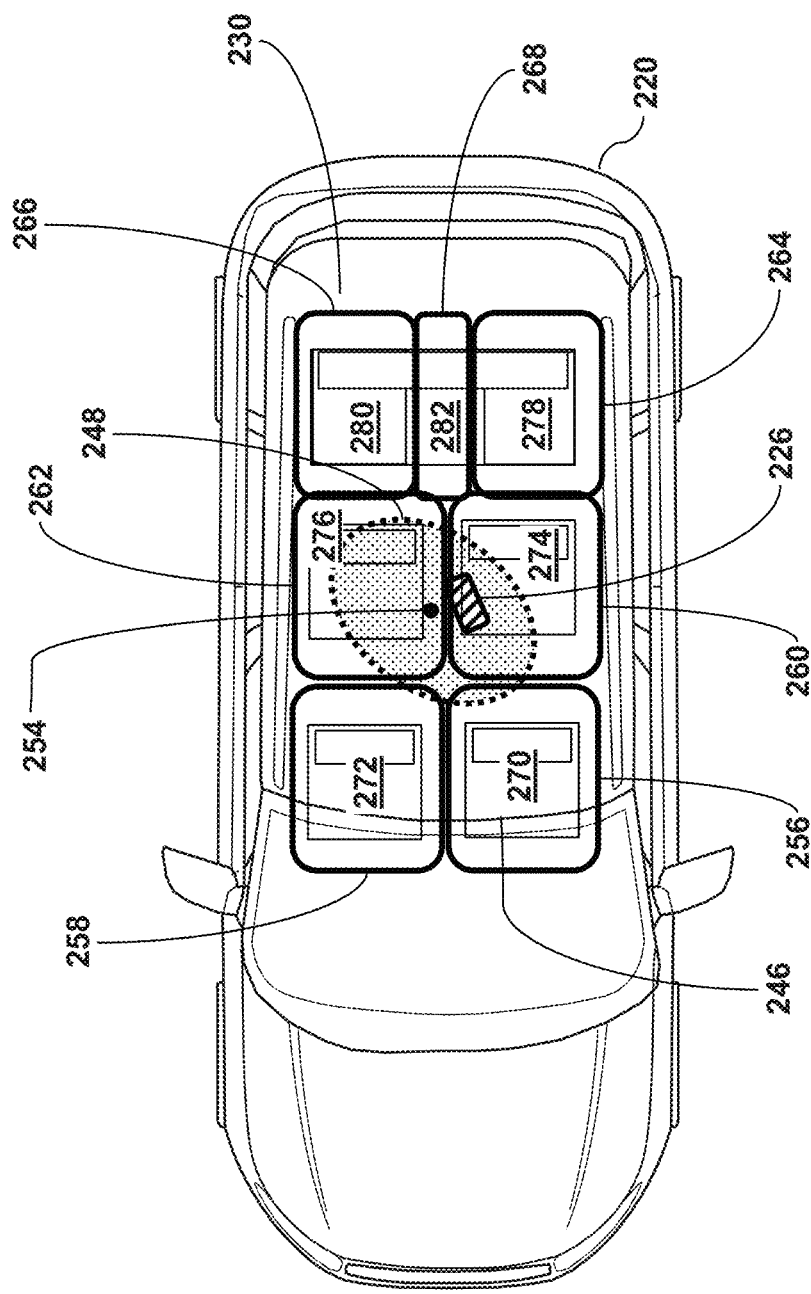
FIG. 9 generally illustrates a top view of the vehicle with occupant zones according to another example.
Figure 11:
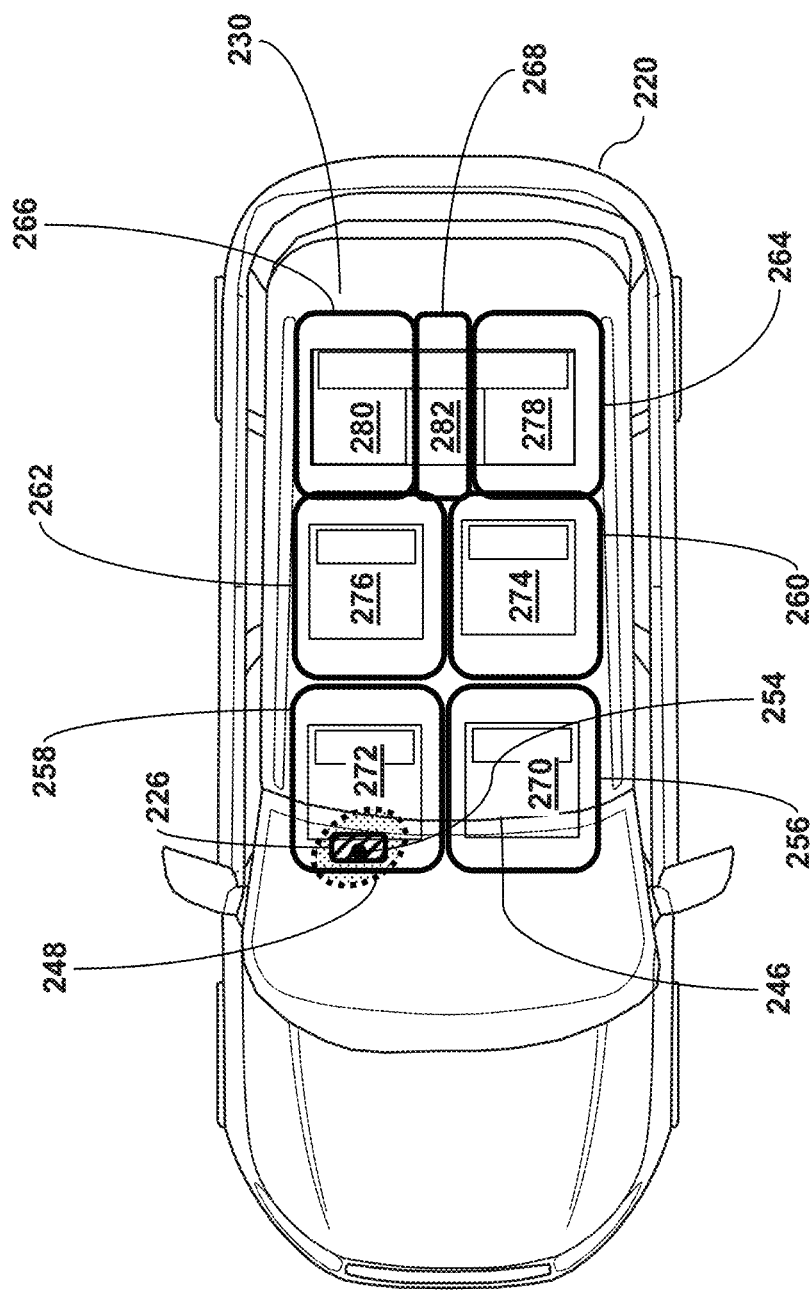
FIG. 11 generally illustrates a top view of the vehicle with occupant zones according to another example.

As illustrated in FIGS. 9 and 11, the first signal source 38 (e.g., communication device 226) may be located within a region 248 of the vehicle 220. The size and shape of the region 248 is formed based upon signal strength data that corresponds to a signal strength of the communication device 226 relative to the at least one antenna 222, 224. The signal strength can be dependent upon the position of the at least one antenna 222, 224 relative to the position of the communication device 226. By way of example, and with reference to FIG. 8, the first antenna 222 may be spaced by a first distance 250 from the communication device 226 and the second antenna 224 may be spaced from the communication device 226 by a second distance 252. Due to the first and second distances 250, 252, the region 248 (e.g., the area in which the communication device 226 resides) may have a width of approximately three sectors 243 and similar or different heights and depths. Further, the region 248 may be oblong (e.g., elliptical), and have a plurality of widths based on the precision of the approximation. What is more, the region 248 may be more or less expansive depending on the first and second distances 250, 252 and may be more than a minimum region that encompasses only the communication device 226. As such, the region 248 may, at least, approximate a location of the communication device 226. It is generally contemplated that the region 248 may or may not be proportional to the dimensions of the communication device 226. For example, and as illustrated in FIGS. 8 and 9, the communication device 226 can be positioned off-center relative to a center 254 of the region 248 due to various orientations of the at least one antenna 222, 224 and or the communication device 226. The variance may cause the system 200 to determine the predicted seating position to be a seating position different than a true seating position.

Referring now to FIG. 9, the system 200 can provide a plurality of occupant zones 256, 258, 260, 262, 264, 266, 268, as previously described in relation to the occupant detection system 32, but referred to herein with reference to a 5-passenger vehicle 220. As exemplarily illustrated, the plurality of occupant zones 256, 258, 260, 262, 264, 266, 268 may include a first occupant zone 256 that corresponds to a driver seat 270, a second occupant zone 258 that corresponds to a front passenger seat 272, a third occupant zone 260 that corresponds to a left middle row seat 274, a fourth occupant zone 262 that corresponds to a right middle row seat 276, a fifth occupant zone 264 that corresponds to a left rear row seat 278, a sixth occupant zone 266 that corresponds to a right rear row seat 280, and a seventh occupant zone 268 that corresponds to a middle rear row seat 282. As exemplarily shown, the communication device 226 is positioned adjacent the left middle row seat 274. However, the center 254 of the region 248 may be positioned closer to the right middle row seat 276.

Due to the difference between the position of the communication device 226 and the position of the center 254 of the region 248, the system 200 may determine the predicted seating position to be the right middle row seat 276. Accordingly, the system 200 may modify the antenna topology 218 to move and/or simulate a move of the first and second antennas 222, 224 to a target position different from the initial position of the first and second antennas 222, 224. The antennas 222, 224 may be moved via a positioning system 283 having at least one actuator that moves the antennas 222, 224 during simulation. The positioning system 283 may include an electro-mechanical actuator (e.g., motor, solenoid, etc.) and/or a mechanical guide that allows the antennas 222, 224 to attach to portions of the vehicle 220 that correspond to a specific sectors 243. The mechanical guide can allow the antennas 222, 224 to be adjusted (e.g., via sliding, rolling, etc.) between sectors 243 for simulating different antenna topologies (see FIG. 19).

As illustrated, the target position for the second antenna 224 may be sector 11,3. In other words, by way of example, had the second antenna 224 been in position 11,3, the region 248 would have been approximated to have a center 254 that overlapped the fourth occupant zone 262. A plurality of target positions may be provided for one or more of the antennas 222, 224, such as sector 9,3, which may directly correspond to the location of the communication device 226. It should be appreciated that the target position/positions may be based on a limited number of antennas that can be incorporated into the antenna topology 218, and that the target position/positions may be determined based on simulating a multitude of positions of the communication device 226. Additionally, or alternatively, the system 200 may maintain the antenna topology 218 and use a comparison of the incorrect predicted seating position to the true seating position to train the machine learning models 215. In this way, and as described with respect to FIGS. 12 and 13, the system 200 may optimize each configuration of the antenna topology 218.

Referring now to FIGS. 10 and 11, another example of the antenna topology 218 is provided with a third antenna 284. As demonstrated in this non-limiting example, the region 248 may be refined to be less expansive than the region 248 illustrated in FIGS. 8 and 9. Accordingly, the communication device 226 may be correctly approximated to overlap with the second occupant zone 258. However, as previously discussed with respect to the scenario in which the driver is the sole occupant 26, the system 200 may employ the machine learning models 215 to correctly determine the predicted seating position to be the driver seat 270. Stated differently, better positioning and/or a greater number of antennas 222, 224, 284 in the antenna configuration may operate in tandem with the trained models to correctly identify the true seating position.

Referring back to FIG. 7, the database 208 can include various data related to optimizing the antenna topology 218, such as first signal source position data, second signal source position data, signal strength data, region data, region center data, etc. This data may correspond to a virtual or a real simulation of the antenna optimization system. For instance, although a physical communication device 226 and a physical antenna may not be provided in a virtual simulation, the first signal source 38 may be a virtual representation of the communication device 226 and the second signal source 42 may be a virtual representation of the antenna 222, 224, 284. In this way, the processor 204 may compute virtual tests/ simulations of each configuration of the antenna topology 218 for all positions of the first signal source 38 in order to determine the optimal antenna topology 218. For example, the machine learning models 215 may be refined for each configuration of the antenna topology 218, thereby maximizing the potential of each configuration. Each optimized configuration may then be compared to the other optimized configurations to determine the superior antenna topology 218. It is generally contemplated that an optimized antenna configuration may include the minimum number of antennas and/or the minimum manufacturing complexity for the antenna positions to attain a specific threshold performance (e.g., 80% accuracy rate). It is also generally contemplated that certain positions of the communication device 226 may be weighted greater than other positions of the communication device 226, such that accuracy of one configuration of the antenna topology 218 may be greater than the accuracy of another configuration because more common communication device positions were weighted heavier than other communication device positions. Stated differently, the correction rate can, in some instances, be an accuracy rate for the most often-occurring situations.

Figure 12:
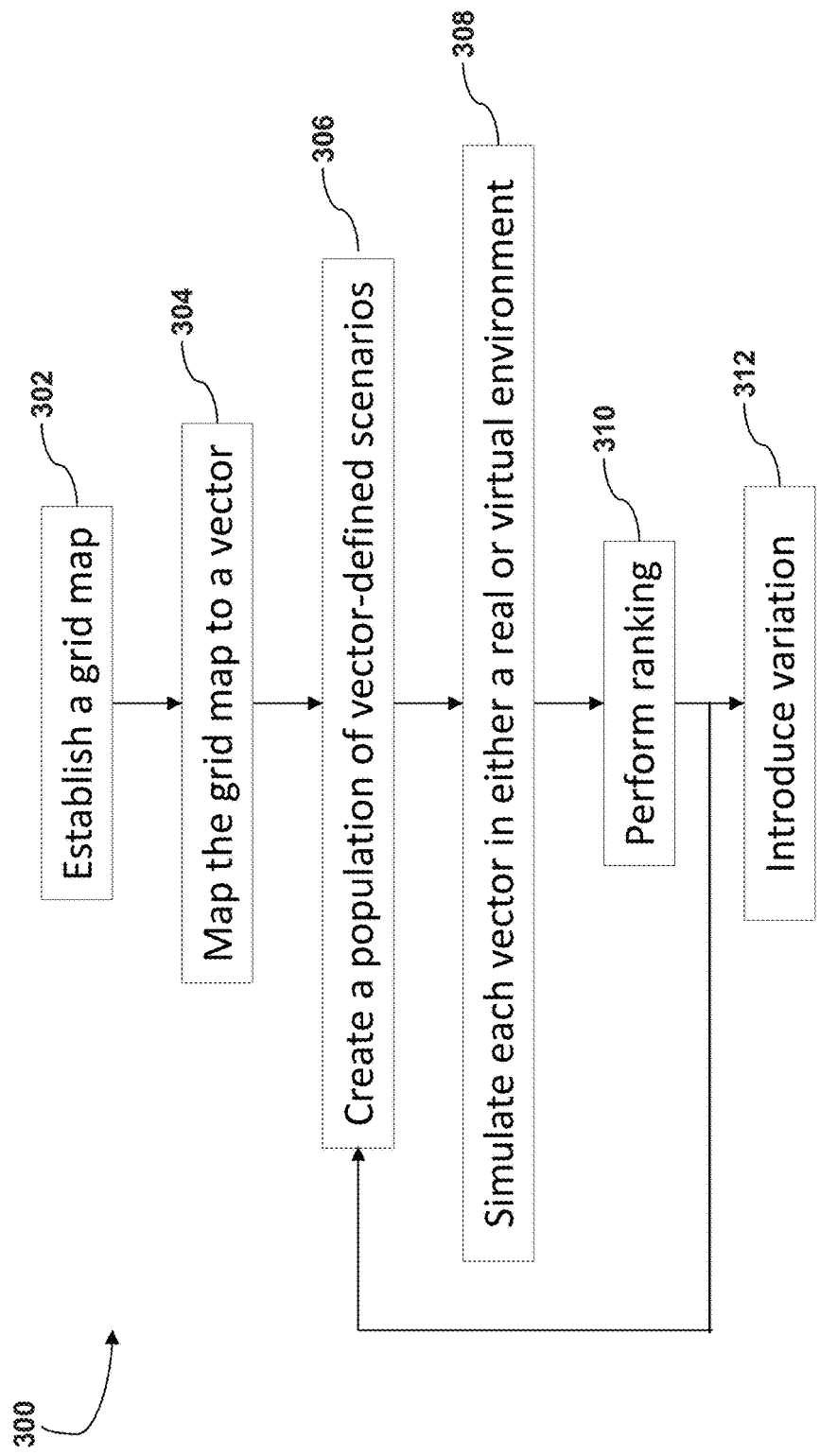
FIG. 12 is a flow diagram depicting a method for optimizing an antenna topology according to another example.
Figure 13:
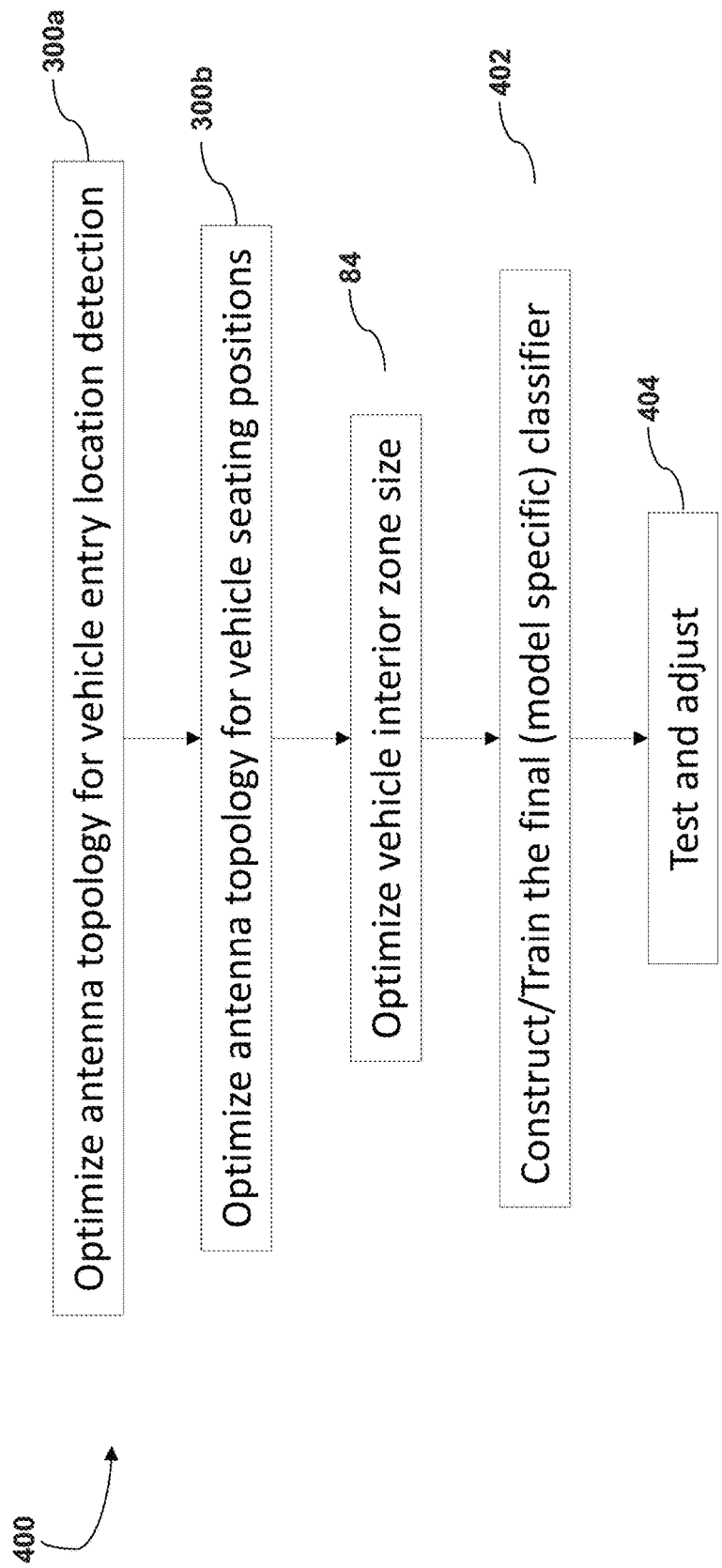
FIG. 13 is a flow diagram depicting a method for optimizing an antenna topology according to another example.

Referring now to FIG. 12, a method 300 for optimizing an antenna topology 218 includes step 302 of establishing a grid map 240. At step 304, the method 300 can then map the grid map 240 to a vector. The vector may be a data type that represents a dynamic array of vector containers, with at least one vector container including a binary value that represents the presence or absence of an antenna 222, 224, 284 in a sector of the grid map 240, The method 300 includes step 306 of creating a population of vector-defined scenarios. For example, one vector-defined scenario consistent with FIG. 8 would be a binary value representing the sectors 243 that contain the antennas 222, 224, 284 and the communication device 226 (9,4; 9,5; 8,3; 9,5; and 11,3)—e.g., a binary value of (32 0's, followed by "1001000000001000000000000001001," followed by 16 0's). This is a non-limiting example of expressing one instance of a vector-defined scenario. After the population of vector-defined scenarios is created, the method 300 includes step 308 of simulating at least some vectors in either a real or a virtual environment (e.g., in the cabin 230 or with virtual representation of the cabin 230). In some examples, the vectors simulated may each have the same communication device position different configurations of the antenna topology 218. In further examples, the population of vector-defined scenarios includes scenarios in which a plurality of communication devices 226 are provided, each with an associated vehicle occupant 26, In these examples, the vector-defined scenarios are configured for a plurality of vehicle seating positions. The method 300 further includes the step 310 of ranking the simulated vectors. In some examples, the ranking may employ n-fold iteration within a convolutional neural network.

The method 300 may recursively create a new population of vector-defined scenarios, simulate the vectors in either a real or virtual environment, and rank the vector-defined scenarios (i.e., steps 306, 308, and 310) until a minimum accuracy threshold is achieved. The newly-created vector-defined scenarios may involve a different position of the communication device 226 tested against a plurality of different antenna topology 218 configurations. Lastly, the method 300 can include the step 312 of introducing variation by applying crossover and/or mutation operations. For example, a neural network may apply the mutation operations to determine the appropriate weights for each vector-defined scenario (e.g., antenna topologies 218 with less antennas may be have greater weight than antenna topologies 218 with many antennas). Implementing the mutation operations may allow other vehicle 220 models and/or body-styles, such as sedans, trucks, mini-vans, etc., to be tested on, By applying the vector-defined scenarios to various vehicle 220 models, the antenna topology 218 for each vehicle 220 type may be determined. Further, comparing the various vehicle 220 model simulations to one another may be accomplished by using a grid schematic that forms four quartiles, as illustrated by dividing lines 288 in FIGS. 8 and 10. Stated differently, while a complex grid map 240 may be applied across a plurality of vehicle 220 types to define the plurality of sectors 243, for some vehicle 220 types, the sectors 243 may only be quartiles of the cabin 230. It is generally contemplated that method 300 may be implemented to optimize the antenna topology 218 for optimizing the occupant zones 256, 258, 260, 262, 264, 266, 268 and/or locating the mobile device within the cabin 230, as well as for optimizing the antenna topology 218 for detecting the vehicle 220 entry location. It is generally contemplated that the method 300 may recursively iterate until each configuration of the viable antenna topology 218 exceeds 80 percent prediction accuracy.

Referring now to FIGS. 13-18, a method 400 of optimizing the occupant detection system 32 is illustrated. The method 400 initially incorporates the method 300 for optimizing the antenna topology 218, including applying a method 300a for optimizing the antenna topology 218 for detecting the vehicle entry location, then applying a method 300b for optimizing the antenna topology 218 for the detecting the vehicle seating position. Once the antenna topology 218 is optimized, the method 400 incorporates the method 84 of executing a trained model to optimize the occupant zone 256, 258, 260, 262, 264, 266, 268 sizes, as described in reference to FIG. 6. The method 400 further includes the step 402 of training a model-specific classifier for individual vehicle models. As previously described, the vehicle seating configuration, size of the cabin 230, shape of the cabin 230, etc., may affect optimization of the occupant zones 256, 258, 260, 262, 264, 266, 268. Lastly, the method 400 includes step 404 of employing final adjustments to the occupant zones 256, 258, 260, 262, 264, 266, 268 based, for example, on specifically identified habits and or customs of vehicle occupants 26, such as storing a driver's communication device 226 in a center console, for example.

Figure 14:
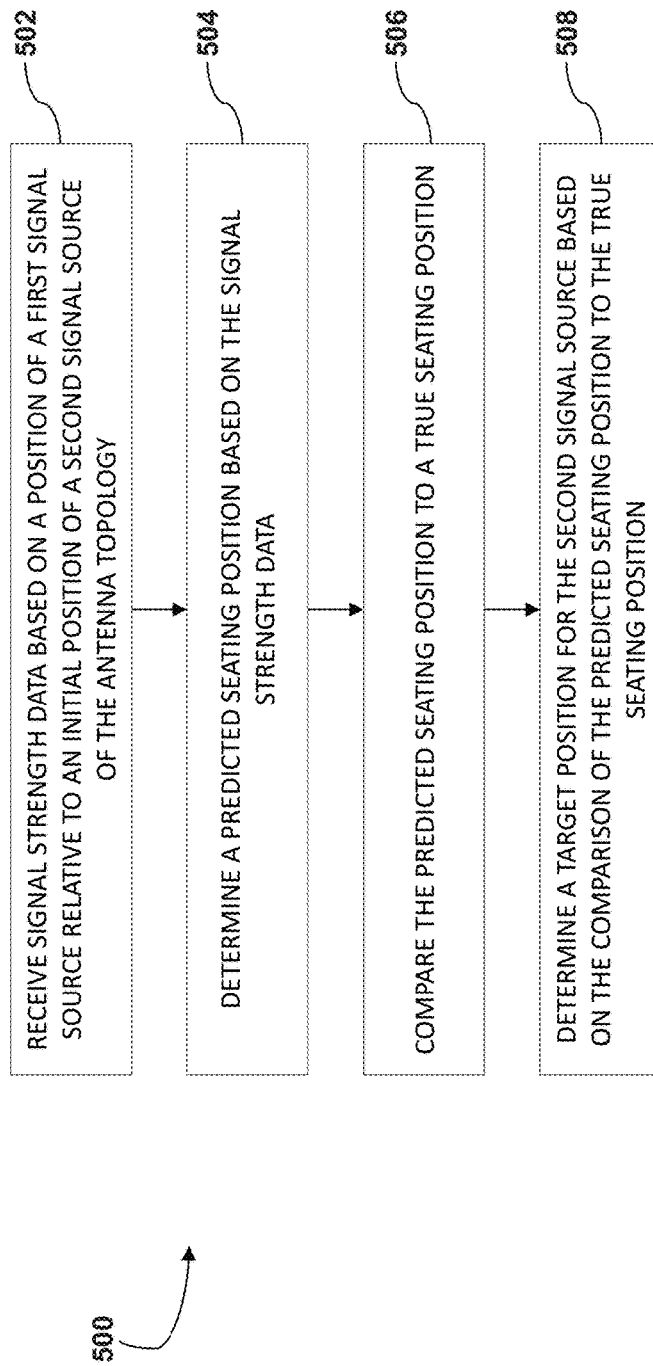
FIG. 14 is a flow diagram depicting a method for optimizing an antenna topology according to another example.

Referring now to FIG. 14, a method 500 for optimizing an antenna topology 218 to detect a seating position of a vehicle occupant 26 includes the step 502 of receiving signal strength data based on a position of a first signal source 38 relative to an initial position of a second signal source 42 of the antenna topology 218. According to further examples, the first signal source 38 is a virtual representation of a communication device 226 and the second signal source 42 is a virtual representation of an antenna 222, 224, 284. The method 500 includes the step 504 of determining a predicted seating position based on the signal strength data. The first signal source 38 can be a communication device 226 associated with the vehicle occupant 26 and the second signal source 42 is an antenna 222, 224, 284 that receives a signal from the communication device 226. In some examples, step 504 can include applying a machine learning model 215 trained to associate the position of the first signal source 38 with the true seating position. Step 504 of determining the predicted seating position can also include determining, based on the signal strength data, a region 248 of the vehicle 220 that corresponds to a location of the communication device 226. Step 504 can further include comparing the region 248 to a plurality of occupant zones 256, 258, 260, 262, 264, 266, 268 associated with positional ranges of a plurality of vehicle seats. For example, overlapping of the region 248 with a given occupant zone 256, 258, 260, 262, 264, 266, 268 may result in a determination that the seating position associated with the given occupant zone 256, 258, 260, 262, 264, 266, 268 is the true seating position.

The method 500 includes step 506 of comparing the predicted seating position to a true seating position. The method 500 includes step 508 of determining a target position for the second signal source 42 based on the comparison of the predicted seating position to the true seating position. In examples, the antenna topology 218 can include a plurality of antennas 222, 224, 284 arranged in a ceiling 246 of the vehicle 220. Further, the true seating position is an actual seating position of the vehicle occupant 26. The step 508 of determining the target position for the second signal source 42 may further be based on a seating configuration of the vehicle 220 and a model of the vehicle 220.

Figure 15:
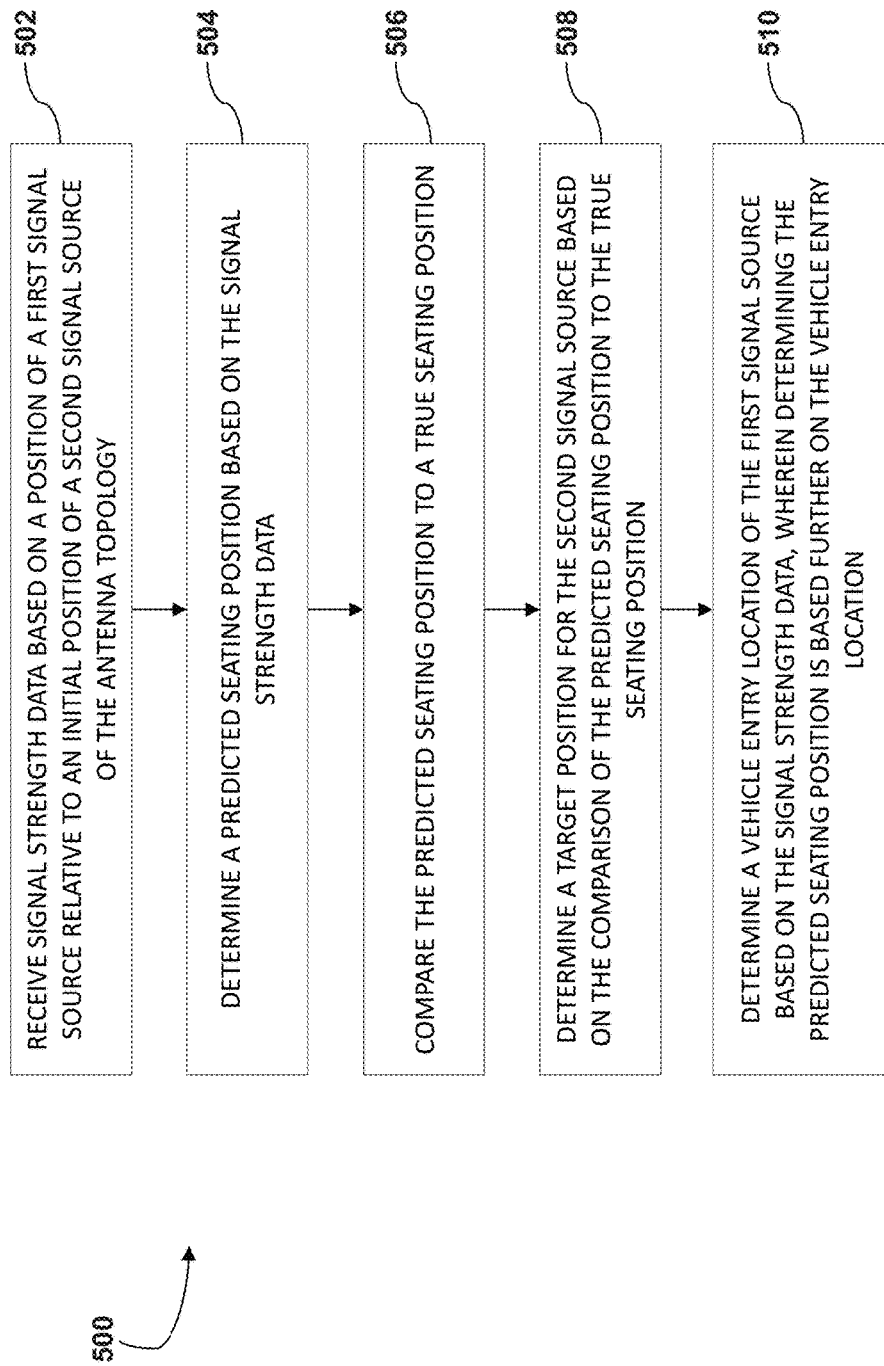
FIG. 15 is a flow diagram depicting a method for optimizing an antenna topology according to another example.

Referring to FIG. 15, the method 500 can include step 514 of determining a vehicle: entry location of the first signal source 38 based on the signal strength data. In some examples, determining the predicted seating position is based further on the vehicle entry location.

Figure 16:
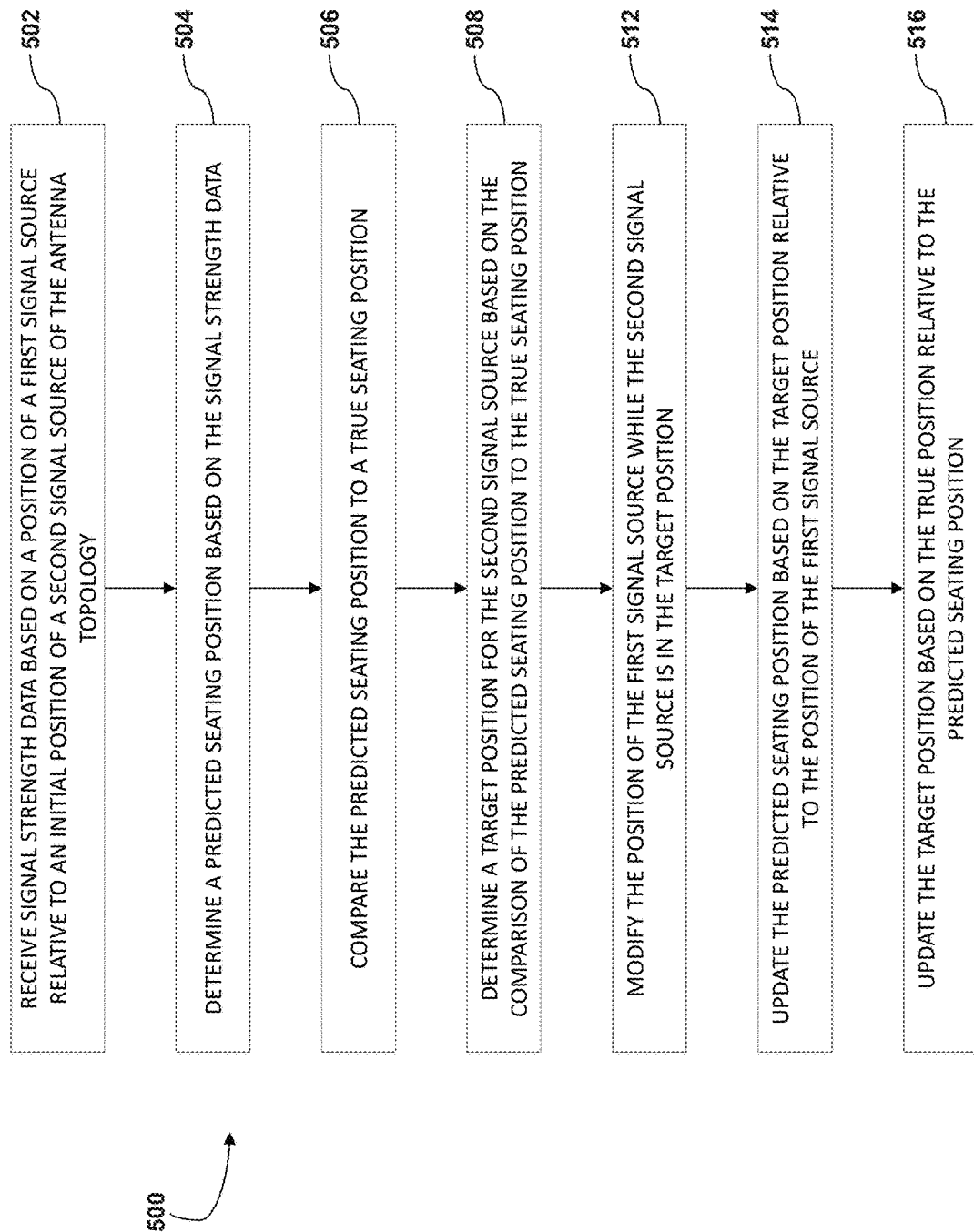
FIG. 16 is a flow diagram depicting a method for optimizing an antenna topology according to another example.

Referring to FIG. 16, the method 500 can include the step 512 of modifying the position of the first signal source 38 while the second signal source 42 is in the target position. The method 500 can include the step 514 of updating the predicted seating position based on the target position relative to the position of the first signal source 38. The method 500 can also include the step 516 of updating the target position based on the true position relative to the predicted seating position.

Figure 17:
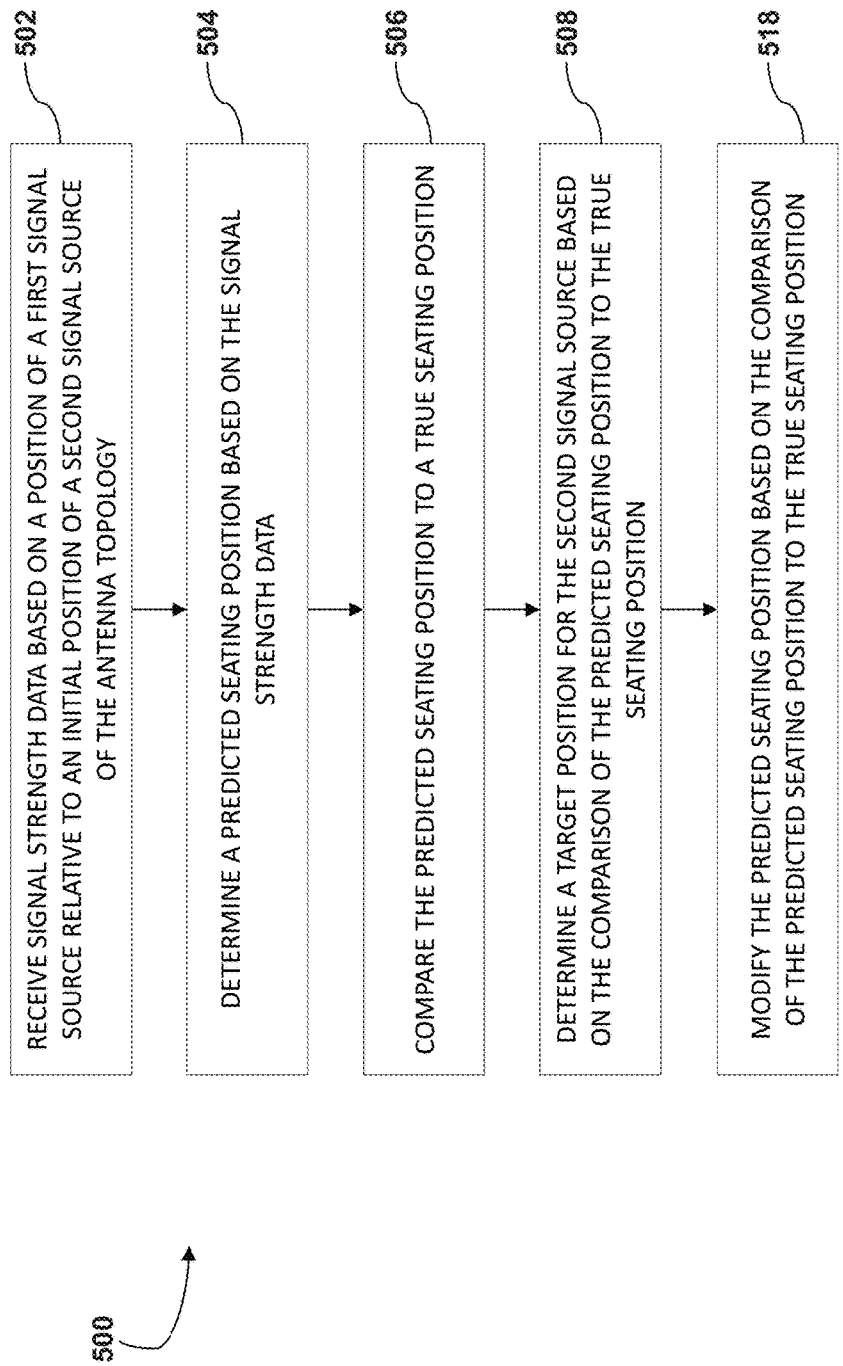
FIG. 17 is a flow diagram depicting a method for optimizing an antenna topology according to another example.

Referring to FIG. 17, the method 500 can include step 518 of modifying the predicted seating position based on the comparison of the predicted seating position to the true seating position. It is generally contemplated that any of steps 502-518, and/or any sub-processes within any of steps 502-518, can be accomplished and/or improved upon via at least one processor, such as the processor 204. For example, the processor 204 may receive the signal strength data, determine the predicted seating position, compare the predicted seating position to the true seating position, and determine the target position. Further, the processor 204 may determine the region of the vehicle 220 that corresponds to the location of the communication device 226 and compare the region to the plurality of occupant zones. In addition, the processor 204 may determine the vehicle entry location, modify the position of the first signal source, update the predicted seating position, and update the target position. Additionally, or alternatively, the positioning system 283 may modify the position of the first signal source. The processor 204 can also modify the predicted seating position.

Figure 18:
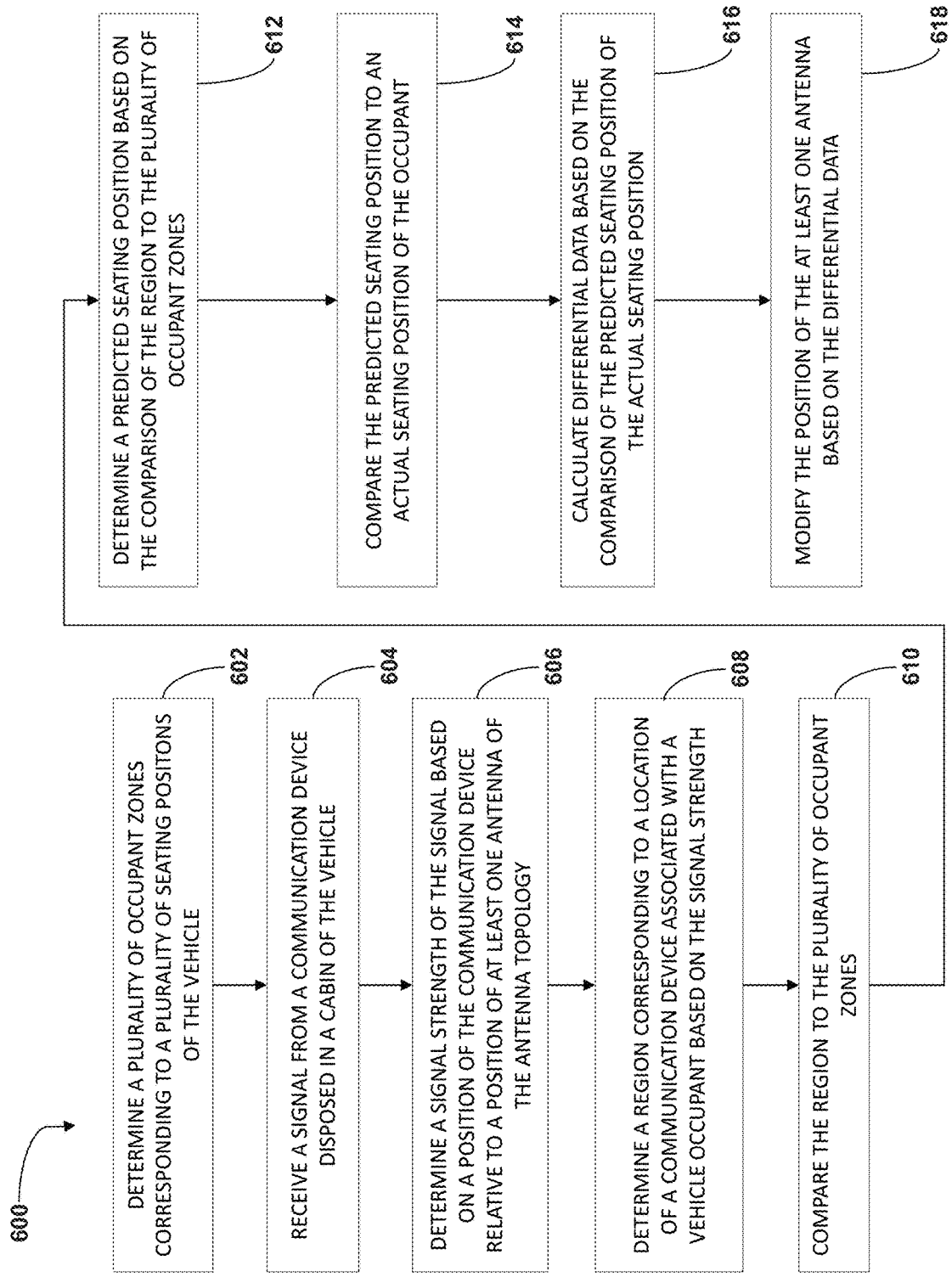
FIG. 18 is a flow diagram depicting a method for optimizing an antenna topology according to another example.

Referring now to FIG. 18, a method 600 for optimizing an antenna topology 218 of a vehicle 220. The method 600 includes step 602 of determining a plurality of occupant zones 256, 258, 260, 262, 264, 266, 268 corresponding to a plurality of seating positions of the vehicle 220. The method 600 includes step 604 of receiving a signal from a communication device 226 disposed in a cabin 230 of the vehicle 220. The method 600 includes step 606 of determining a signal strength of the signal based on a position of the communication device 226 relative to a position of at least one antenna 222, 224, 284 of the antenna topology 218. For example, the communication device 226 may be a mobile device (e.g., smartphone) configured with wireless communication capabilities.

The method 600 includes step 608 of determining a region 248 corresponding to a location of a communication device 226 associated with a vehicle occupant 26 based on the signal strength. For examples, the region 248 may be an approximation of the location of the smartphone. The method 600 includes step 610 of comparing the region 248 to the plurality of occupant zones 256, 258, 260, 262, 264, 266, 268. The method 600 includes step 612 includes determining a predicted seating position based on the comparison of the region 248 to the plurality of occupant zones 256, 258, 260, 262, 264, 266, 268. The method 600 includes step 612 of comparing the predicted seating position to an actual seating position of the occupant 26. The method 600 includes step 614 of including calculating differential data based on the comparison of the predicted seating position of the actual seating position. In some examples, the differential data may include positional data corresponding to a distance between the region 248 and one or more of the occupant zones 256, 258, 260, 262, 264, 266, 268. The method 600 includes step 616 of modifying the position of the at least one antenna 222, 224, 284 based on the differential data. For example, providing a different configuration of the antenna topology 218 may allow the antenna topology 218 to be tested and/or optimized.

It is generally contemplated that any of steps 602-618, and/or any sub-processes within any of steps 602-618, may be performed and/or improved upon via at least one processor, such as the processor 204. For example, processor 204 may determine the plurality of occupant zones, receive the signal (e.g., via an antenna or secondary processor of the communication device 226), determine the signal strength, determine the region, and compare the region to the plurality of occupant zones. In addition, the processor 204 may determine the predicted seating position, compare the predicted seating position to the actual seating position, and calculate the differential data. The processor 204 may also, in tandem with the positioning system 283, modify, the position of the at least one antenna 222, 224, 284 based on the differential data. For example, the processor 204 may issue an instruction to adjust the at least one antenna 222, 224, 284 to a position that corresponds to a particular sector 243. The instruction can include an electrical signal that controls an actuator of the positioning system 283 to move the at least one antenna 222, 224, 284 and/or can control the human-machine interface 212 to display a message and/or sector coordinate for the at least one antenna 222, 224, 284.

Figure 19:
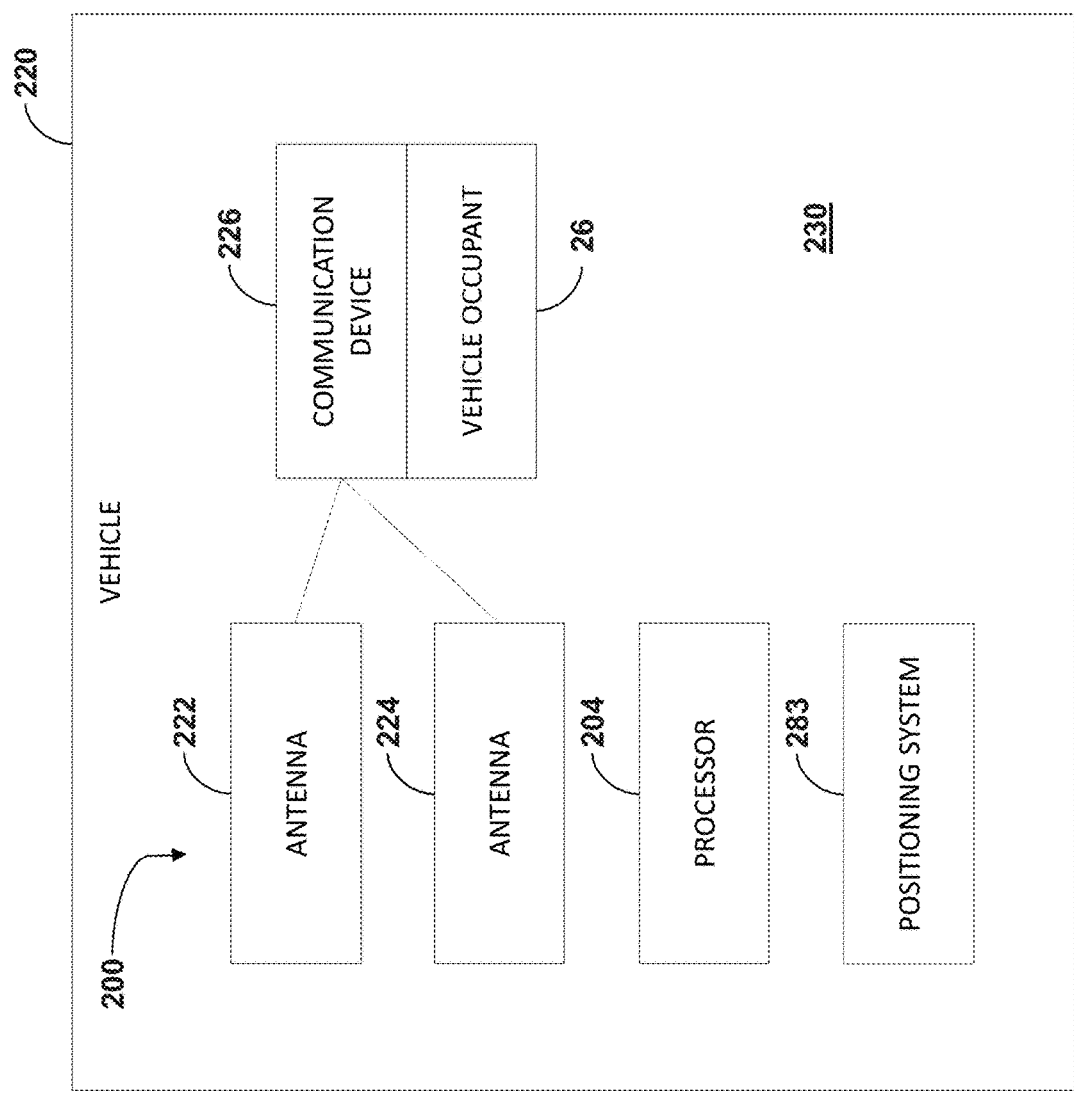
FIG. 19 is a block diagram of a system for optimizing an antenna configuration according to another example.

Referring now to FIG. 19, a system for optimizing an antenna topology 218 of a vehicle 220 includes at least one antenna 222, 224, 284 of the antenna topology 218 that receives a signal from a communication device 226 disposed within a cabin 230 of the vehicle 220. The communication device 226 is associated with a vehicle occupant 26 having an actual seating position in the vehicle 220. A processor 204 determines a plurality of occupant zones 256, 258, 260, 262, 264, 266, 268 corresponding to a plurality of seating positions of the cabin 230. The processor 204 further determines a signal strength of the signal based on a position of the communication device 226 relative to a position of the at least one antenna 222, 224, 284. The processor 204 determines a region 248 corresponding to a location of a communication device 226 associated with a vehicle occupant 26 based on the signal strength. The processor 204 compares the region 248 to the plurality of occupant zones 256, 258, 260, 262, 264, 266, 268. The processor 204 determines a predicted seating position based on the comparison of the region 248 to the plurality of occupant zones 256, 258, 260, 262, 264, 266, 268. The processor 204 compares the predicted seating position to an actual seating position of the occupant 26. The processor 204 calculates differential data based on the comparison of the predicted seating position of the actual seating position. The processor 204 modifies the position of the at least one antenna 222, 224, 284 based on the differential data. A positioning system 283 can be employed to adjust the position of the at least one antenna 222, 224, 284.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A method for optimizing an antenna topology to detect a seating position of a vehicle occupant, the method comprising:
receiving, via a processor, signal strength data based on a position of a first signal source relative to an initial position of a second signal source of the antenna topology;
determining a predicted seating position based on the signal strength data via the processor;
comparing the predicted seating position to a true seating position via the processor; and
determining; via the processor, a target position for the second signal source based on the comparison of the predicted seating position to the true seating position.

2. The method of claim 1, wherein the first signal source is a communication device associated with the vehicle occupant and the second signal source is an antenna that receives a signal from the communication device.

3. The method of claim 1, wherein determining the predicted seating position includes:
determining, based on the signal strength data, a region of the vehicle that corresponds to a location of the communication device via the processor; and
comparing the region to a plurality of occupant zones associated with positional ranges of a plurality of vehicle seats via the processor.

4. The method of claim 1, wherein determining the predicted seating position includes:
applying a machine learning model trained to associate the position of the first signal source with the true seating position.

5. The method of claim 1, further comprising:
determining; via the processor; a vehicle entry location of the first signal source based on the signal strength data, wherein determining the predicted seating position is based further on the vehicle entry location.

6. The method of claim 1, wherein the first signal source is a virtual representation of a communication device and the second signal source is a virtual representation of an antenna.

7. The method of claim 1, wherein the antenna topology includes a plurality of antennas arranged in a ceiling of a vehicle, and further wherein the true seating position is an actual seating position of the vehicle occupant.

8. The method of claim 7, wherein determining the target position for the second signal source is further based on a seating configuration of the vehicle and a model of the vehicle.

9. The method of claim 1, further comprising:
modifying the position of the first signal source while the second signal source is in the target position;
updating, via the processor, the predicted seating position based on the target position relative to the position of the first signal source; and
updating, via the processor, the target position based on the true position relative to the predicted seating position.

10. The method of claim 1, further comprising:
modifying the predicted seating position based on the comparison of the predicted seating position to the true seating position via the processor.

11. A system for optimizing an antenna topology of a vehicle, the system comprising:

at least one antenna of the antenna topology that receives a signal from a communication device disposed within a cabin of the vehicle, the communication device associated with a vehicle occupant having an actual seating position in the vehicle; and
a processor that:
determines a plurality of occupant zones corresponding to a plurality of seating positions of the cabin;
determines a signal strength of the signal based on a position of the communication device relative to a position of the at least one antenna;
determines a region corresponding to a location of a communication device associated with a vehicle occupant based on the signal strength;
compares the region to the plurality of occupant zones;
determines a predicted seating position based on the comparison of the region to the plurality of occupant zones;
compares the predicted seating position to an actual seating position of the occupant;
calculates differential data based on the comparison of the predicted seating position of the actual seating position; and
modifies the position of the at least one antenna based on the differential data.

12. The system of claim 11, wherein the processor further:
determines the predicted seating position by applying a machine learning model trained to associate the position of the communication device with the actual seating position.

13. The system of claim 11, wherein the processor further:
determines a vehicle entry location of the communication device based on the signal strength, wherein determining the predicted seating position is based further on the vehicle entry location.

14. The system of claim 11, wherein the at least one antenna includes a plurality of antennas arranged in a ceiling of the vehicle.

15. The system of claim 11, wherein the processor further:
modifies the predicted seating position based on the comparison of the predicted seating position to the actual seating position.

16. A method for optimizing an antenna topology of a vehicle, the method comprising:
determining, via a processor, a plurality of occupant zones corresponding to a plurality of seating positions of the vehicle;
receiving a signal from a communication device disposed in a cabin of the vehicle via the processor;
determining a signal strength of the signal based on a position of the communication device relative to a position of at least one antenna of the antenna topology via the processor;
determining a region corresponding to a location of the communication device associated with a vehicle occupant based on the signal strength via the processor;
comparing, with the processor, the region to the plurality of occupant zones;
determining, via the processor, a predicted seating position based on the comparison of the region to the plurality of occupant zones;
comparing, with the processor, the predicted seating position to an actual seating position of the occupant;
calculating, via the processor, differential data based on the comparison of the predicted seating position of the actual seating position; and modifying the position of the at least one antenna based on the differential data.

17. The method of claim 16, wherein determining the predicted seating position includes:
applying a machine learning model trained to associate the position of the communication device with the actual seating position.

18. The method of claim 16, further comprising:
determining, via the processor, a vehicle entry location of the communication device based on the signal strength, wherein determining the predicted seating position is based further on the vehicle entry location.

19. The method of claim 16, wherein the at least one antenna includes a plurality of antennas arranged in a ceiling of the vehicle.

20. The method of claim 16, further comprising:
modifying the predicted seating position based on the comparison of the predicted seating position to the actual seating position.

* * * * *